United States Patent
Trim et al.

(10) Patent No.: US 11,205,350 B2
(45) Date of Patent: Dec. 21, 2021

(54) IOT-DRIVEN PROPRIOCEPTIVE ANALYTICS WITH AUTOMATED PERFORMER FEEDBACK

(71) Applicant: International Business Machines Corporation, Armonk, NY (US)

(72) Inventors: Craig M. Trim, Ventura, CA (US); Shubhadip Ray, Secaucus, NJ (US); Jeremy R. Fox, Georgetown, TX (US); Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 16/412,940

(22) Filed: May 15, 2019

(65) Prior Publication Data
US 2020/0365044 A1    Nov. 19, 2020

(51) Int. Cl.
*G09B 5/02* (2006.01)
*G06F 3/01* (2006.01)
*H04L 29/08* (2006.01)

(52) U.S. Cl.
CPC ............... *G09B 5/02* (2013.01); *G06F 3/016* (2013.01); *G06F 3/012* (2013.01); *H04L 67/12* (2013.01)

(58) Field of Classification Search
CPC ............ G09B 5/02; G06F 3/016; G06F 3/012
See application file for complete search history.

(56) References Cited

U.S. PATENT DOCUMENTS

| | | | |
|---|---|---|---|
| 5,249,967 A | 10/1993 | O'Leary | |
| 7,658,695 B1 | 2/2010 | Amsbury et al. | |
| 9,427,659 B2 | 8/2016 | Ferguson et al. | |
| 10,013,794 B1 * | 7/2018 | Waggoner | G06F 3/04815 |
| 10,043,406 B1 * | 8/2018 | Huang | H04N 21/44008 |
| 10,579,861 B2 * | 3/2020 | Kohlmeier-Beckmann | H04N 13/279 |
| 10,838,488 B2 * | 11/2020 | Gibson | G06T 17/00 |
| 2003/0109301 A1 | 6/2003 | Chudley et al. | |

(Continued)

FOREIGN PATENT DOCUMENTS

WO    2015139089 A1    9/2015

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — David E Choi
(74) *Attorney, Agent, or Firm* — Mark Bergner

(57) ABSTRACT

A computer-implemented system and method receives an optimal maneuver profile (OMP) that is based on a maneuver profile (MP) comprising spatial information to perform a maneuver (M), and MP conditions associated with the MP. The method includes determining student conditions present at a student performance location, and then creating a target maneuver profile (TMP) for the student to perform. The TMP is based on an optimal maneuver profile (OMP) and factors in the conditions, professional conditions under which the OMP was created, and the student conditions. The student performance is measured and recorded in a student maneuver profile (SMP) that includes measured spatial information of the student performance. The method then compares the SMP with the TMP. Automated feedback is provided based on the comparing.

25 Claims, 9 Drawing Sheets

(56) References Cited

U.S. PATENT DOCUMENTS

| | | | |
|---|---|---|---|
| 2009/0189982 A1 | 7/2009 | Tawiah | |
| 2013/0274587 A1 | 10/2013 | Coza et al. | |
| 2017/0232324 A1 | 8/2017 | May | |
| 2017/0308909 A1* | 10/2017 | Faith | G06K 9/00315 |
| 2018/0224350 A1* | 8/2018 | Story | G01M 5/0066 |
| 2018/0293802 A1* | 10/2018 | Hendricks | G09B 23/30 |
| 2019/0066327 A1* | 2/2019 | Fujimoto | G06T 7/70 |
| 2019/0114482 A1* | 4/2019 | Li | G06Q 10/06 |
| 2019/0163266 A1* | 5/2019 | Johnson | G06F 3/017 |
| 2019/0311649 A1* | 10/2019 | Cook | G09B 5/00 |
| 2019/0311718 A1* | 10/2019 | Huber | G06F 1/3231 |
| 2020/0365044 A1* | 11/2020 | Trim | G06F 3/016 |

OTHER PUBLICATIONS

Robson Forensic, "The Effect of Warm Temperatures on Skiing & Snowboarding Safety," https://www.robsonforensic.com/articles/warm-temperatures-skiingsnowboarding-safety-expert, printed Feb. 19, 2019, 10 pgs.

Sabour, S., "Build a Fitness App using IBM Watson Data Platform and 3rd Party Fitness APIs—IBM Cloud Blog," https://www.ibm.com/blogs/bluemix/2017/09/build-fitness-app-using-ibm-watson-data-platform-3rd-party-fitness-apis/, Sep. 11, 2017, 9 pgs.

Tamblyn, S ., "Frontside 180s and Half Cabs off jumps. Freestyle Snowboarding Tricks," https://www.youtube.com/watch?v=QDtVKBbgcgM, published Jul. 23, 2009, printed Feb. 19, 2019, 2 pgs.

Unknown, "IBM Gives Tennis Players a Competitive Edge with Watson at the 2018 Open Tennis Championships," https://newsroom.ibm.com/2018-08-29-IBM-Gives-Tennis-Players-a-Competitive-Edge-with-Watson-at-the-2018-US-Open-Tennis-Championships, Aug. 29, 2018, 1 pg.

* cited by examiner

IOT-DRIVEN PROPRIOCEPTIVE ANALYTICS WITH AUTOMATED PERFORMER FEEDBACK

BACKGROUND

Disclosed herein is a system and related method for IoT-driven proprioceptive analytics that may be focused on a maneuver, including its components, and that provides automated feedback to help a student improve their performance of the maneuver. Proprioception refers to the sense of the relative position of one's own body parts and the effort and/or strength used in movement. The coordination of proprioception in the human body is largely unconscious or sub-conscious. Changes and improvements in technique for body movement may largely be the results of hundreds or thousands of training hours, and training-based evolution may produce a recursive focus by the human on the ability to further enhance a person's ability pertaining to kinesthesia (sense of body movement).

However, a problem with existing systems is that they do not always provide a clear path for improving certain coordinated activities, referenced herein as a maneuver, and do not always provide a precise example. Furthermore, when a student attempts to perform a particular maneuver, it is not always clear to the student how close she is to achieving an optimum performance of the maneuver, what specific actions she needs to work on to perform the maneuver optimally, and the best way, in her specific case, to go about improver her performance of the maneuver.

SUMMARY

According to one aspect disclosed herein, a computer-implemented method is provided for receiving an optimal maneuver profile (OMP) that is based on a maneuver profile (MP) comprising spatial information to perform a maneuver (M), and MP conditions associated with the MP. The method includes determining student conditions present at a student performance location, and then creating a target maneuver profile (TMP) for the student to perform. The TMP is based on the optimal maneuver profile (OMP) that factors in the conditions, professional conditions under which the OMP was created, and the student conditions. The student performance is measured using a sensor, and this performance is recorded a student maneuver profile (SMP) that includes measured spatial information of the student performance. The method then compares the SMP with the TMP. Automated feedback is provided based on the comparing. Advantageously, this method provides clear and specific feedback to the student as to what activities and practice techniques the student can make to improve their performance of a maneuver.

According to one aspect disclosed herein, a computer-implemented method is provided for creating and storing a maneuver profile (MP) comprising spatial information to perform a maneuver, and MP conditions associated with the MP. The MP is stored in a maneuver profile databased (MPDB) stored in a memory of a proprioceptive analytics server (PAS). The method further comprises determining professional conditions present at a professional performance location, measuring a professional performance of the maneuver using a sensor and recording an optimal maneuver profile (OMP) that includes measured spatial information of the professional performance into the MPDB. The method further comprises determining student conditions present at a student performance location. A target maneuver profile (TMP) is created for the student to perform that is based on the optimal maneuver profile (OMP) stored in the MPDB and that factors in the conditions, professional conditions under which the OMP was created, and the student conditions. The method further comprises measuring a student performance of the maneuver using a sensor and recording a student maneuver profile (SMP) that includes measured spatial information of the student performance into the MPDB, the method then comprises comparing the SMP with the TMP and storing the comparison in the MPDB. Finally, the method comprises providing automated feedback based on the comparing. Advantageously, in addition to the preceding method, this method allows the capture of a professional performance of the maneuver that can serve as the target for comparing the student's performance of the maneuver against.

According to one aspect disclosed herein, a proprioceptive analytic system is provided comprising a sensor that records information at a location of a performance of a maneuver (M), a processor configured to perform a number of operations. These operations cause the processor to receive an optimal maneuver profile (OMP) that is based on a maneuver profile (MP) comprising spatial information to perform the M and MP conditions associated with the MP, and determine student conditions present at a student performance location. A target maneuver profile (TMP) is created for the student to perform that is based on the optimal maneuver profile (OMP) and that factors in the conditions, professional conditions under which the OMP was created, and the student conditions. A measure of a student performance of the maneuver obtained from the sensor and the processor records a student maneuver profile (SMP) that includes measured spatial information of the student performance. The processor is further configured to compare the SMP with the TMP to produce a comparison. Finally, the processor is configured to provide automated feedback based on the comparison. Advantageously, this system provides clear and specific feedback to the student as to what activities and practice techniques the student can make to improve their performance of a maneuver.

According to one aspect disclosed herein, a proprioceptive analytic system is provided comprising a proprioceptive analytics server (PAS) comprising a memory comprising a maneuver profile databased (MPDB). The PAS further comprises a PAS processor configured to perform a number of operations. The operations include having the PAS processor create and store, in the maneuver profile databased (MPDB), a maneuver profile (MP) that comprises spatial information to perform a maneuver, and MP conditions associated with the MP. The system comprises an on-site device comprising a sensor that records information at a location of a performance of a maneuver (M), and an on-site device processor configured to determine professional conditions present at a professional performance location. The processor is also configured to measure a professional performance of the maneuver by use of a sensor and record an optimal maneuver profile (OMP) that includes measured spatial information of the professional performance into the MPDB. The processor is further configured to determine student conditions present at a student performance location, where at least one of the PAS processor and the on-site device processor is configured to create a target maneuver profile (TMP) for the student to perform that is based on the optimal maneuver profile (OMP) stored in the MPDB and that factors in the conditions, professional conditions under which the OMP was created, and the student conditions. The processor is configured to measure a student performance of the maneuver by use of a sensor and record a student maneuver profile (SMP) that includes measured spatial information of the student performance into the MPDB, and compare the SMP with the TMP and store the comparison in the MPDB. The processor is further configured to provide automated feedback based on the comparison. Advantageously, this system provides clear and specific feedback to the student as to what activities and practice techniques the student can make to improve their performance of a maneuver, and splits processing of information across an on-site device that is able to analyze and communicate to provide the student with very speedy feedback on their performance while an off-site server is able to provide a large amount of storage and non-time-critical processing of large volumes of information.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
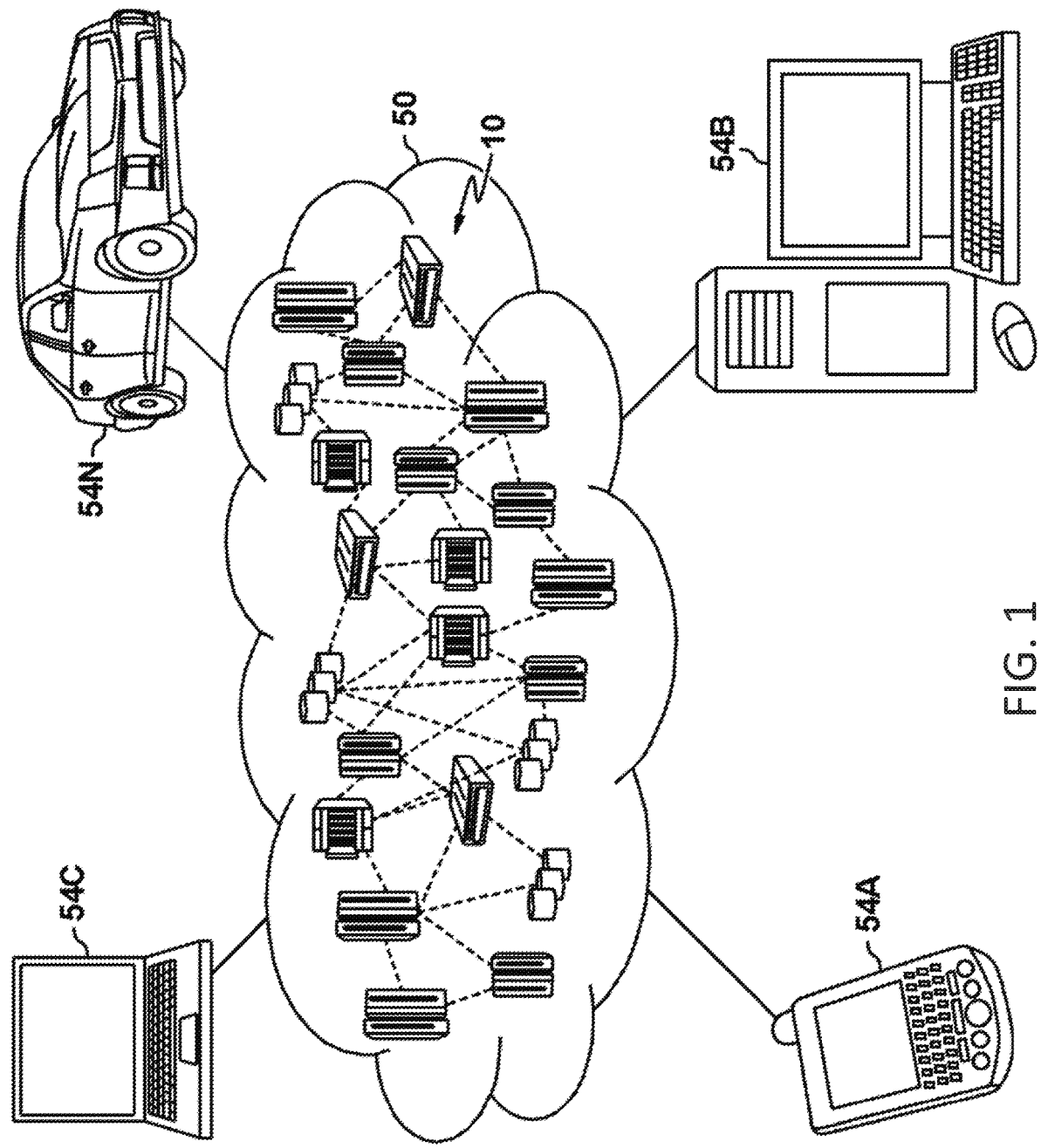
FIG. 1 depicts a cloud computing environment according to an embodiment of the present invention.

It is desirable to help users improve their proprioceptive sense when they are performing physical activities—but in order to do so, multiple variables may need to be managed. This improvement and management may be provided in the context of the performance of a maneuver (M), which is a series of actions that may be performed by a performer in a particular sequence. The maneuver may be made up of components (or sub-parts) of the maneuver (CMs) (the Ms, CMs, or groupings/sets of either may also be referred to herein as "tricks"). Typically, a student—defined herein as person learning the maneuver—would learn each of the components before attempting to perform the entire maneuver. However, it is also possible that there are additional practice components of the maneuver (PCMs) that are used to train the student, but that do not ultimately become part of the maneuver or that are learned in a different way than are applied in the performance of the maneuver. For example, in order to perform a back flip on a mat, a PCM for the training program may be learning how to properly fall in the event of a back flip failure—the "proper fall" PCM may not form a part of the final M, but may be a part of the training program for M. Thus, a maneuver might be defined as:

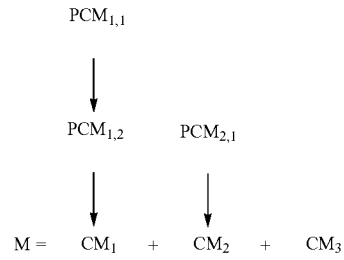

A use case will be used throughout this application to illustrate various embodiments and implementations of the invention. However, the use case is intended only as an illustrative example and should not be construed as limiting the scope of the invention, which may be applied to any field involving human motion. In this use case, the maneuver is an action in the sport of snowboarding called a half-cab, which is a common maneuver that most beginning snowboarders try. The half-cab is a switch-frontside 180° spin that may be done off an obstacle like a halfpipe, or rail. It may comprise the sub-components of an approach crouch $CM_1$, a heel-edge pop $CM_2$, and a hip twist $CM_3$. However, it may be difficult for a student to practice the approach crouch $CM_1$ while in motion, and thus, for training purposes, a first practice component $PCM_{1,1}$ may involve crouching without a snowboard while stationary on the ground. A second practice component $PCM_{1,2}$ may involve crouching with a snowboard while on a trampoline. Once the student has mastered the practice components PCMs, she may advance to actually practicing the component of the maneuver $CM_1$ which is practicing the approach crouch while on a snowboard and moving on snow.

Although the distinctions between maneuvers Ms, components of the maneuver CMs, and practice components of the maneuver PCMs are described above, for the sake of clarity, conciseness, and avoidance of repetitiveness, processes described herein as relating to Ms, CMs, and PCMs may also be considered to apply to the other element levels unless expressly indicated otherwise. For example, a statement, "data recorded for the M may be stored in the database" may also be considered to apply to data recorded for a CM and/or a PCM as well. Similarly, a statement, "data recorded for the CM . . . " may also be considered to apply to data recorded for an M or PCM as well. Furthermore, the components CMs (and PCMs) may be further broken down into sub-components and sub-sub-components . . . to any number of levels in a hierarchy. Thus, any discussion herein of Ms, CMs and PCMs may be considered to apply to any sub-level of the Ms, CMs and PCMs as well.

As described above, the maneuver M may be initially defined at a high level in terms of its components CM. However, an initial M definition (a maneuver profile (MP)) may provide just a basic framework from which a student may learn how to perform the maneuver. In order to provide additional information, the student may benefit from data obtained from a performer who is able to perform the maneuver (i.e., a performance of the maneuver profile (PMP)) in an exemplary manner. Such a person is designated as a "professional" herein. Thus, a performer may be either a professional who creates an ideal performance (or "ground truth execution") of the maneuver, or a student who is attempting to learn the maneuver. When the professional performs the maneuver, the data obtained from the performance may be called the professional performance of the maneuver profile (PPMP), and when the student performs the maneuver, the data obtained from the performance may be called the student performance of the maneuver profile (SPMP). Although a performer (professional or student) is generally considered to be a live person whose information about performing the maneuver is recorded, it is also possible that the performer is a virtual person whose attributes are simply modeled in the computer. Such a virtual performer may be useful for modeling certain conditions (e.g., to provide data on performers of widely varying weights) that may be difficult or costly to model using live individuals. In one implementation, a dummy may be used to perform the maneuver. Thus, a performer, as used herein, may encompass a live performer, a dummy, and a virtual performer.

The system, when it is recording information about a performer, should be told whether the performer is a professional or a student (or the system may be able to determine this by examining a performer profile). For a given performance of an M by a professional, it may be possible to designate the performance as one that is to be kept as a good example of performing the M or to be discarded as a bad example (e.g., a mistake was made by the performer). For a given performance of an M by a student, information about the performance may be stored along with prior performances so that it may be possible to compare progress (or lack thereof) of the student and provide automated feedback for better subsequent performance.

When a student is executing the M, the system monitors their performance and compares measured values of their performance (SPMP) to measured values of the professional performance (PPMP), although, as discussed in more detail below, conditions surrounding each PMP may be recorded and used to modify aspects of the PMPs or the comparison. In addition to actual measured values related to the performance, variables derived from the respective performances may be compared as well. Based on this analysis, the system may provide an output to the student that allows the student to make incremental improvements towards perfecting the maneuver. The output/feedback may range from after the fact (e.g., after the maneuver is completed) review with prescriptive recommendations and suggestions to help the student improve, to real-time in the moment review and suggestions. The real-time feedback may include haptic feedback, e.g., vibrating, mild electronic stimulation, or other sensory feedback, e.g., providing a stimulation to various muscle or muscle groups involved in the maneuver, and particularly those requiring adjustment as compared to the target maneuver profile. The real-time feedback may also include controlling feedback, e.g., controlling the muscle groups themselves in the form of electronic stimulations that are strong enough to force muscles to contract so that the student performs the maneuver correctly or even avoids a move that may result in injury, or even attached robotic components that force body parts to move in specific ways. The real-time feedback may be provided via student wearable devices, such as head-mounted displays (HMD) (e.g., smart glasses, a virtual-reality (VR) or augmented-reality (AR) headset), or other visual device providing visual information to the student, audio devices, such as headphones, earphones, or other speaker-type devices, as well as haptic or controlling devices embedded, affixed to, or positioned proximate the student's clothing.

In order to allow for a better comparison and feedback, conditions associated with the performance may be taken into account, both for the professional performance as well as the student performance. Condition information for a performance may contain any information surrounding a performance and may be gathered from a wide variety of sources. In the example use case, a frictional force on the snowboard may be of some relevance at a particular stage of the maneuver. However, the frictional force may not be measurable directly, and may need to be derived from: the weight of the performer, the shape of the snowboard, the type of wax used on the snowboard, and the temperature. When such conditions are known for each performance, adjustments may be made to compensate for variation and provide better feedback. For example, temperature differences between the location of the performances of the professional and the student may require slight modifications in order for the student to successfully perform the maneuver. Some conditions may be performance independent, and thus may be associated directly with the MP. Other conditions may be performance dependent, and thus may be associated with the PMP. For the sake of conciseness, collectively, all of the data related to the MP, its performance independent conditions, the PPMP, and performance dependent conditions may be referred to as an optimal maneuver profile (OMP). Similarly, all of the data related to the MP, its performance independent conditions, the SPMP, and performance dependent conditions may be referred to as a student maneuver profile (SMP). A target maneuver profile (TMP) may be an OMP that has been adjusted based on all relevant conditions and used as a basis for comparison of a student performance.

The following acronyms may be used below:

| API | application program interface |
| ARM | advanced RISC machine |
| CD-ROM | compact disc ROM |

| | |
|---|---|
| CM | component (or sub-part) of a maneuver |
| CMS | content management system |
| CoD | capacity on demand |
| CPU | central processing unit |
| CUoD | capacity upgrade on demand |
| DPS | data processing system |
| DVD | digital versatile disk |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| LTA | logging/tracking/audit |
| M | maneuver |
| MP | maneuver profile |
| MPDB | maneuver profile database |
| OMP | optimal maneuver profile |
| PaaS | platform as a service |
| PAS | proprioceptive analytics server |
| PCM | practice component of the maneuver |
| PDA | personal digital assistant |
| PLA | programmable logic arrays |
| PMP | performance of a maneuver profile |
| PPMP | professional performance of maneuver profile |
| RAM | random access memory |
| RISC | reduced instruction set computer |
| ROM | read-only memory |
| SaaS | software as a service |
| SLA | service level agreement |
| SOI | search optimization service |
| SMP | student maneuver profile |
| SPMP | student performance of maneuver profile |
| SRAM | static random access memory |
| TMP | target maneuver profile |
| WAN | wide-area network |

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
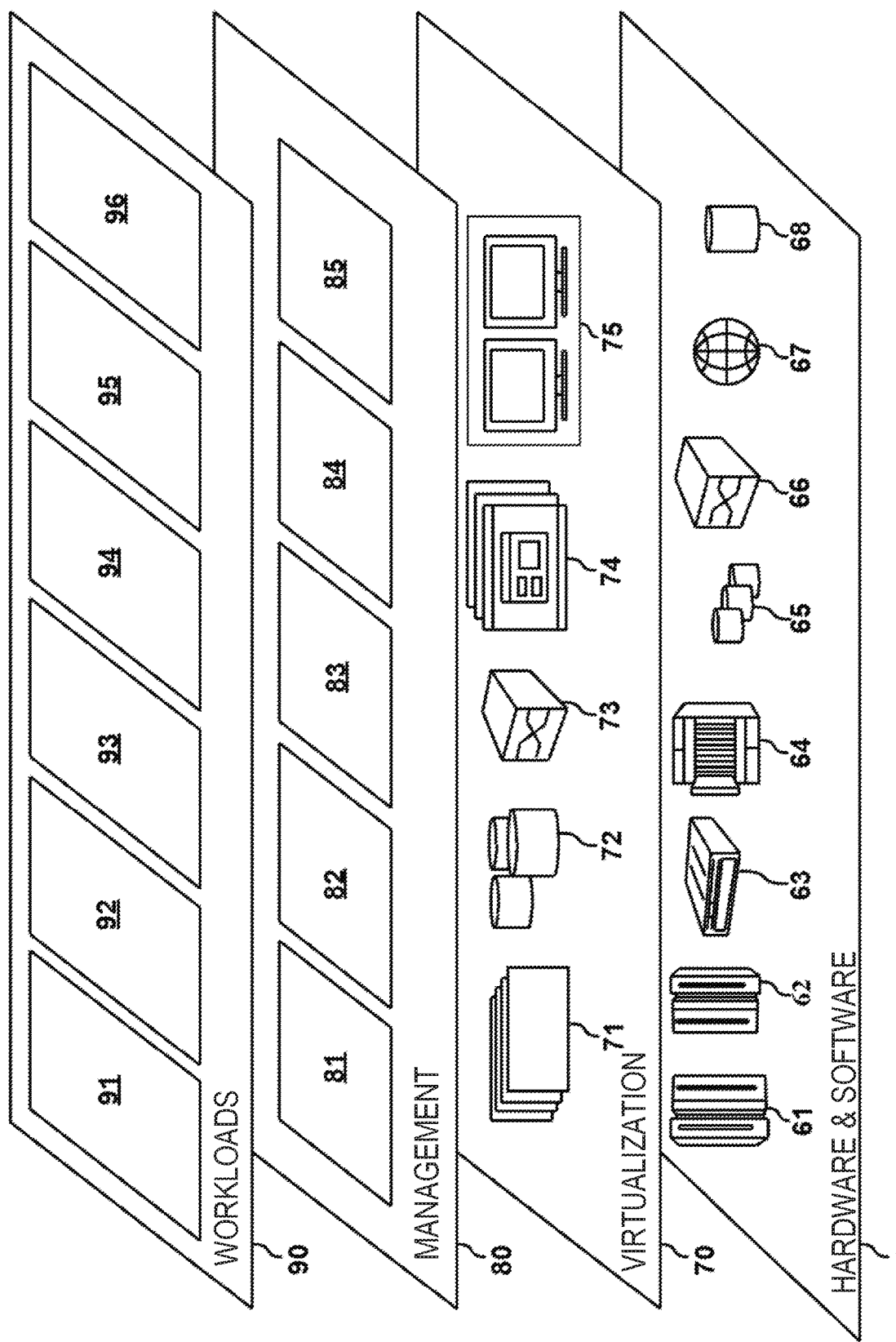
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
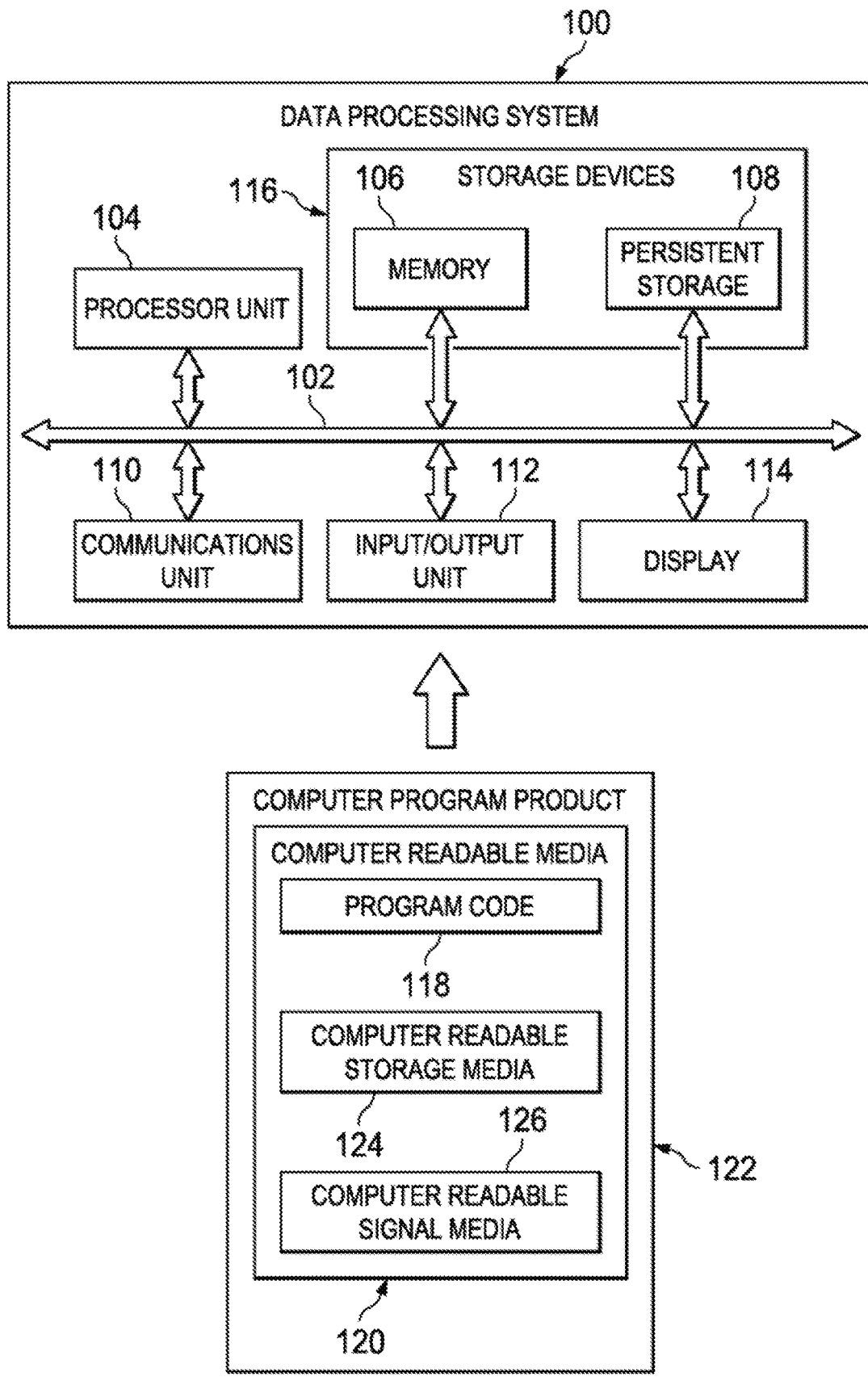
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

Figure 4:
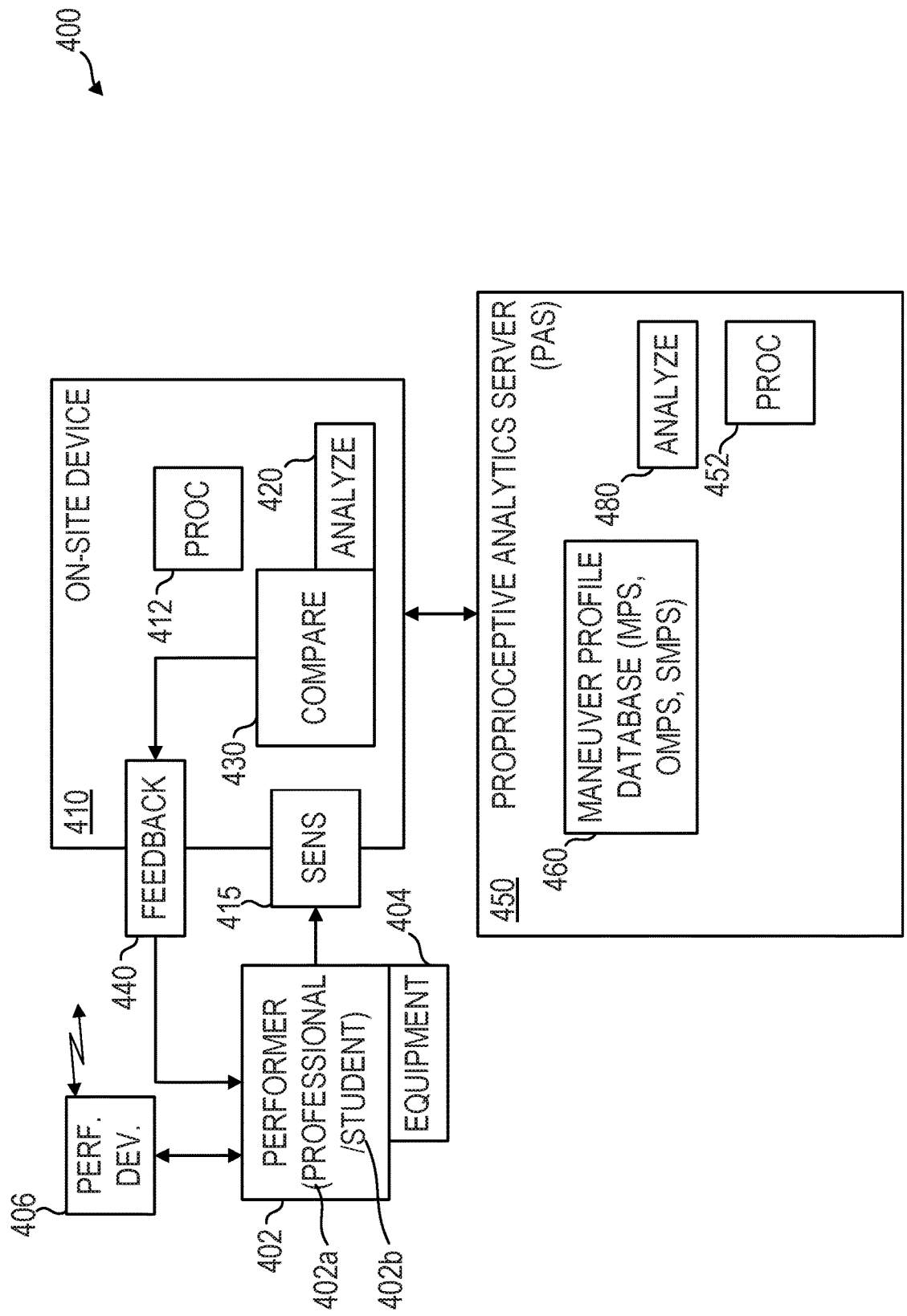
FIG. 4 is a block diagram of one or more embodiments of a proprioceptive analytics system disclosed herein.

FIG. 4 is a block diagram illustrating the primary components of the system 400, in accordance with embodiments of the present disclosure. As discussed above, in order to help a student master a maneuver, data for an optimal execution of the maneuver may be obtained. As shown in FIG. 4, a performer 402 who is a professional may be employed to perform the maneuver. A professional who performs the maneuver may first indicate to the system 400 that she is a professional, and thus the system, upon receiving the indication that she is a professional will treat her performance of the maneuver and resultant data as that of a professional (e.g., no feedback about specific aspects of the performance is given, ask if the performance is to be kept or discarded so that the system receives an indication as to whether to keep a particular professional performance or not, etc.). Upon completion of the professional's performance of the maneuver, the professional may indicate to the system whether this performance is a good performance and should be treated as an example, or whether this performance is a bad performance (e.g., due to an error) and should be discarded. A maneuver may be performed multiple times by multiple professionals, and the data for all good performances may be kept. The multiple professionals may perform the maneuver under differing circumstances or conditions, and the different performances may be stored in association with the respective different conditions. The multiple professionals may each perform a different component of the maneuver CM, or they may perform the same components of the maneuver CM and their multiple data may be merged together to, e.g., form a range of acceptable performance values that may be taken into consideration when the student performs the maneuver M. For example, one professional may have their legs bent at 150° during an approach, whereas another professional may have their legs bent at 120° during the same approach. The system may then determine that the average of these, 135° is the ideal angle, or that anything within this range constitutes an ideal.

The system 400 may comprise two broad elements: an on-site device 410, which may be located proximate to a location where the performance takes place, and a proprioceptive analytics server (PAS) 450, which may be located with the on-site device 410 or remote from the site. When the PAS 450 is located in a same location as the on-site device 410, the combined functionality of these two elements as described herein may be performed in a single unit. The on-side device 410 may be implemented or incorporate, by way of example, the DPS 100. Similarly, the PAS 450 may be implemented or incorporate, by way of example, the data processing system 100. However, in some implementations, the on-site device 410 and the PAS 450 are interconnected via a network and implemented using, e.g., a cloud computing environment 50. Non-limiting examples of various forms of the network used to interconnect the on-site device 410 and the PAS 450 are discussed herein.

The on-site device 410 may be used to collect data from various stages of the performance of the maneuver. Performance data may be measured with one or more sensors 415. These sensors 415 may be contained within, affixed to, or co-located with the on-site device 410 and/or the performer 402. For example, the sensors 415 may include one or more video cameras that capture video data during the performance, or a heartrate monitor affixed to or a part of the performer's 402 clothing. The sensor(s) 415 may encompass a narrow or wide range of sensing devices and functionalities, and may be as simple as a single still image or a video camera that captures the motion or timed positions of the performer 402 and their gear/equipment 404 (if any). The sensors 415 may make use of light detection and ranging (LIDAR) analytics along with video geospatial movement analytics. The sensors 415 may be non-contact, as are the cameras and LIDAR described above, or they may be contact, such as wearables. Contact sensors 415 may be accelerometers that measure acceleration at a point where they are mounted (on the performer 402 and/or the equipment 404) or worn, and, in conjunction with a processor 412, may be able to provide velocity and position information as well. Position, velocity, acceleration, and other spatial information may be derivable the location sensors and/or from images taken by cameras, LIDAR information, gyro sensors, accelerometers, and the like. The performer 402 may wear special markers or other objects that make detection of various physical locations or aspects easier. The performer 402 may have a performer device 406, which may be a device such as a smartphone or the like that is able to communicate over a network, such as a wireless network, with the on-site device 410 and the PAS 450. The performer device 406 may comprise, for example, an app that allows it to interact with applications on the on-site device 410 and applications on the PAS 450. The performer device 406 may be portable and be carried with the performer, and therefore may further comprise an interface that is connected to wearable sensors, an augmented reality display worn by the performer, and mechanisms used to provide feedback to the performer, where appropriate.

The on-site device 410 may comprise a processor 412 that handles processing activities for, e.g., the sensors 415, an analysis component 420, a comparison component 430, a feedback component 440, and any other components of the on-site device 410. Multiple processors 412 may be present, and where components whose functionality is split across the on-site device 410 and wearables of the performer 402 and/or equipment 404, or whose functionality is solely located on the wearables of the performer 402 and/or equipment 404, a distinct processor 412 may be present there as well. For example, a wearable heartrate sensor 415 may also be provided with a processor that provides high-level information back to the on-site device 410.

As with any capture of information from sensors relating to actions of a performer, care should be given to obtain full consent from the performer for the capture and use of data. According to some embodiments, such consent may be provided by a traditional agreement that is executed by the performer. In some embodiments, such consent may be obtained electronically, and it may also be possible in some embodiments to obtain consent broadly to cover an entire supply of a performance by the professional or an entire training course of action by the student, or in other embodiments to obtain consent narrowly and specific to each individual performance and type of data collection and usage that may be applied to the performer. Consent may be obtained, in some embodiments, via an opt-in feature(s), whereas in other embodiments, consent may be obtained via opt-out feature(s). Furthermore, in some embodiments, the performer may be notified when data collection has started.

The analysis component 420 may process data coming from the sensors 415 and perform a variety of analytical functions. For example, it may create high-level point, line, and surface features representing various parts of the performer 402 and/or equipment 404 from more limited data received by the sensor. Thus, when the system records information associated with a performance, the system may first acquire exemplars, which are example data points representative of a larger group of data points. In affinity propagation, clusters may be formed around exemplars. One example of this might be illustrated as follows. The performer 402 may have a dot placed on their ankle, a dot placed on their knee, and a dot placed on their hip. The sensor 415 data, in the form of a video image, may provide time-based position information on these three points. The analysis component 420 may then proceed to recognize the three-dimensional lower- and upper-leg position over time from these three points. One advantage of this type of analysis is that it may permit maneuver profiles, discussed in more detail below, to be stored with higher level information (e.g., lower- and upper-leg positions) than is initially obtained from the sensors 415 (e.g., ankle dot, knee dot, and hip dot positions). The analysis component 420 may contain routines for performing spatial analysis, translations, definitions, and the like.

When the performer 402 is a student, additional components may be utilized in order to assist the student in performing the maneuver. A comparison component 430 may be provided (which may or may not be a part of the analysis component 420) may be utilized to compare differences between the student's performance of the maneuver with the professional's performance of the maneuver, or to compare data within or derived from SMPs with that of the related OMPs. A feedback component 440 may be used to provide feedback on the student's performance to help the student better perform the maneuver. When the feedback is provided in real time, the feedback may help the student better perform the current maneuver, whereas when the feedback is provided after-the fact, the feedback may help the student better perform the maneuver in the future. Thus, output to the student may range from an after the fact (e.g., after the maneuver is completed) review with prescriptive recommendations and suggestions to help the student improve, to real-time in the moment review and suggestions, via, e.g., text or imagery in a heads-up display or VR/AR headset, audio feedback (spoken text, audio signals) through headphones, haptic feedback via vibration of devices adjacent to the skin at different positions on the student's body, and/or even muscular stimulation in a form of electronic stimulations as stimulation to various muscle or muscle groups involved in the maneuver. The application of electronic stimulations may be simply to alert the student to a problem or issue, or electronic stimulations may be provided to actually control various muscle groups themselves by forcing muscles to contract so that the student performs the maneuver correctly or avoids a move that may result in injury.

The professional performing a maneuver may interact with a user interface of the on-site device 410 and/or the PAS 450 to enter in one or more names, description(s), and/or tags of the maneuver in order to allow others to locate it. For example, in the use case described above, in addition to naming the maneuver/trick "half-cab", the maneuver or trick may also be tagged with "snowboarding" that may be used to distinguish it from a similar maneuver for skateboarding. Any level of description may be added to the maneuver M (and CMs, etc.), as well as conditions associated with the M. Once relevant information about the maneuver has been entered, the professional may start recording information related to their performance of the maneuver, and additionally, once a performance is complete, the professional may add additional information to the performance in a form of, e.g., metadata tags and the like. The recording controls for recording a performance may operate in a manner similar to a video recorder, e.g., having start, stop, and pause controls.

The sensors 415 may be used to provide information about conditions of a performance, such as weather conditions (e.g., temperature, via a thermometer sensor), snow depth (via, e.g., a digital snow depth gage), etc., but such conditions may be provided by the performer 402 or obtained from some other source. For example, terrain information, as conditions, such as degree of slope, may be obtained from other sources, e.g., a GPS location unit and a map server with terrain-related information.

All of the information obtained relative to a performance (e.g., about the performer, the equipment, the surrounding conditions, etc.) may be provided to the PAS 450 and stored in a maneuver profile database 460 and a related conditions database (which may be implemented as a part of the maneuver profile database). The conditions may incorporate a wide range of relevant information. In the use case discussed above, the conditions may include weather information (e.g., temperature), scene conditions (depth of snow, snow characteristics, slope of the terrain), shape, size, and brand of snowboard along with wax brand/type. Simply put, the conditions may contain any other relevant data that is not already a part of the spatial information in the maneuver profile database 460. In this way, the PAS 450 may contain as much information as possible about how the maneuver should best be performed along with available conditions related to the performance.

The maneuver profile database 460 may contain maneuver profiles (MPs) (without performance information), maneuver profiles of the professionals (optimal maneuver profiles (OMPs)) and maneuver profiles of the students (student maneuver profiles (SMPs)), and each maneuver profile may have associated conditions with it—for the performance maneuver profiles, the conditions under which the maneuver was performed may be stored in a conditions database contained within or associated with the maneuver profile database 460. The PAS 450 may comprise a processor 452 that is used to execute software for various components of the PAS 450. The PAS 450 may have an analysis component 480 that performs various analytic operations related to the performances. The processor 412 of the on-site device 410 and the processor 452 of the PAS 450 may provide similar, complementary, or overlapping functionality. For example, when an after-the-fact analysis is to be completed and presented to the user, such a non-time-critical analysis may be better provided by a processor 452 of the PAS 450, whereas when a real-time analysis is to be provided to the user, such a time-critical analysis may be better provided by a processor 412 of the on-site device in order to minimize network delays and/or to maximize distributed processing power.

Figure 5:
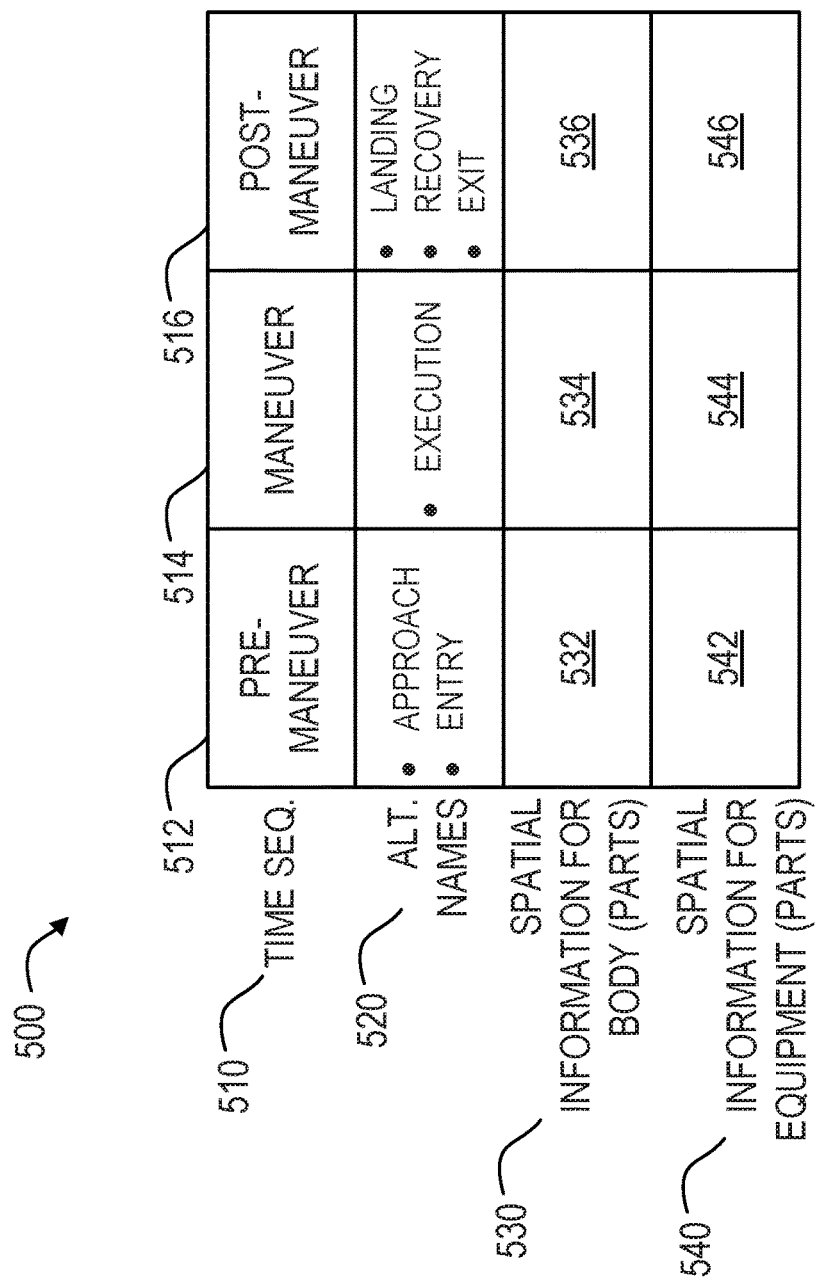
FIG. 5A is a table that illustrates a potential record of information that may be stored in the maneuver profile database and that is associated with a performance of the maneuver.
FIG. 5B is a table that illustrates one possible example organization of informational records within the maneuver profile database.

Spatial information of the performer's 402 body parts and equipment 404 may be derived by sensor data that is received from the sensor(s) 415 and stored in the maneuver profile database 460. FIG. 5A is a table 500 that illustrates a potential record of information that may be stored in the maneuver profile database 460 and that is associated with a performance of the maneuver. FIG. 5A illustrates an example time sequence 510 for a maneuver, including a pre-maneuver stage 512, a maneuver stage 514, and a post maneuver stage 516. The time sequence 510 shown in FIG. 5A is for illustrative purposes only, and the maneuver may be further broken down into sub-stages. Additionally, a maneuver may be broken down into sub-maneuver components, each of which may have the above-mentioned stages or sub-stages. The sub-maneuvers, stages, and sub-stages may be sequential, overlapping, or partially overlapping. As shown in the table 500, alternate names 520 may be used for the stages, depending on language that may be typically associated with a particular sport or maneuver. For example, the pre-maneuver 512 may also be referred to as an approach or an entry. The maneuver stage 514 may also be referred to as the execution, and the post-maneuver 516 may also be referred to as a landing, a recovery, or an exit. Other names may be applicable to these stages and other stages as well. A maneuver, as defined herein, may be a trick or formed from multiple tricks, i.e., a trick may be thought of as a sub-maneuver. Although the alternate names 520 are provided here for illustrative purposes, such alternate names may actually form a part of the data contained within the table.

Associated with each stage or substage is spatial information for the body and body parts 530 and any equipment or equipment parts 550. As shown in the table 500, the spatial information for body parts 530 may be stored for the pre-maneuver 512, maneuver 514, and post-maneuver 516 (532, 534, 536, respectively). Also as shown in the table 500, the spatial information for equipment parts 540 may be stored for the pre-maneuver 512, maneuver 514, and post-maneuver 516 (542, 544, 546, respectively). As defined herein, spatial information may include information about position, including x, y, z spatial coordinates and $\alpha$, $\beta$, $\gamma$ angular components. Spatial information may be stored according to some form of absolute reference frame (e.g., a fixed location on a ramp or on the ground) and/or according to a relative reference frame (e.g., a location on the user's forehead), and multiple position values may be stored of the same point but with respect to different reference frames. The spatial information may contain components for points, lines (and line segments), planes, surfaces, and 3-D volumes. It may further contain position, velocity, acceleration, shock, and any other time-based description of motion through space.

FIG. 5B is a table that illustrates one possible example organization of informational records within the maneuver profile database 460. The maneuver profile MP may contain profile information for the maneuver that does not generally vary over time (e.g., the basic steps to perform the maneuver) and any performance invariant conditions ICOND (e.g., a snowboard as equipment, a minimum depth of snow for the maneuver, etc.). The performance information of the professional PPMP along with the associated conditions related to the performance $COND_P$ may make up the optimal maneuver profile OMP.

As noted above, multiple professionals may perform the maneuver or parts thereof, and thus there may be a $PPMP_1 \ldots PPMP_n$ stored in a record of the profile database 460. In one implementation, even with multiple professional performances, there is a single OMP that serves as a basis for subsequent comparison, and may be formed by combining together professional performances of CMs making up an M, and/or values of the different professional performances may be averaged out, provided as a bounding range for certain variables, or combined according to some other formula or algorithm. In another implementation, multiple professional performances may be maintained as separate OMPs. These two approaches may also be combined, e.g., ten professionals' performances may be distilled down into two primary OMPs.

An illustrative example may be provided using temperature. When the temperature is well below freezing, the snow may exhibit more friction with the snowboard and thus alter how the half-cab is performed. For example, low temperature/more friction may require a higher speed of approach. In one implementation, two professionals may perform the maneuver—one at the low temperature, and another at a higher temperature closer to freezing. Thus, there is data for two separate professional performances ($PPMP_{P1}$ and $PPMP_{P2}$ (the latter not shown)). The temperature condition varies for each performance. When the student attempts the maneuver, the temperature condition is measured, and if the temperature is low, the student SMP is compared against the OMP of the professional performance at the lower temperature. If the temperature is higher, nearer freezing, the student SMP is compared against the OMP of the professional performance at the higher temperature.

However, if there is a single OMP, then either the SMP or the OMP may be temporarily adjusted prior to performing the comparison in order to compensate for the temperature difference and variation in friction and hence approach speed required. In one implementation, a target maneuver profile may be created and be used as the basis for comparison for the student performance. The target maneuver profile (TMP) may be the OMP as temporarily modified to consider all conditions associated with the relevant maneuver profiles. Thus, an OMP performed at 0° F. may be used by a student performing the maneuver at 30° F., but a TMP may be used as a basis for comparison that modifies the OMP taking the student's conditions into account. The TMP may require a slower approach at the higher temperature than the OMP, and this TMP is used when providing feedback to the student. When multiple OMPs are utilized, the TMP may be derived from multiple OMPs, such as by averaging certain values of the OMPs or applying some other formulaic approach.

For a first student, multiple performances $SPMP_{S1,1}$ & $SPMP_{S1,2}$ may be recorded along with the associated conditions for performance. Each student performance may be compared against the OMP (or an appropriate OMP that most closely matches the conditions associated with the current SMP) in order to provide feedback to the student. The maneuver profile MP and invariant conditions ICOND may form a part of the SMP (or, e.g., be referenced by pointers), but remain constant for a particular maneuver. The maneuver profile database 460 may contain information for multiple maneuvers along with multiple professional and student performances for each maneuver.

Once the professional 402a has performed a maneuver, and the OMP and related conditions for the performance have been recorded, the professional 402a may go back in and add further information. For example, additional information constituting where the different phases or subphases of the maneuver begin and end may be added, or information about particular sensors 415 may be incorporated (which may be done either before or after the professional 402a has performed the maneuver). For example, the PAS 450 may initially only know of the existence of two accelerometers, S1 and S2. The professional 402a may then register S1 as being a left wrist sensor, and S2 as being a left elbow sensor. With this information, the processor 452 on the PAS may be able to produce a more sophisticated model since it may also now deduce that a line connecting the S1 and S2 sensors is, in fact, a left forearm and thus perform further analyses for the left forearm.

Once an OMP and its related conditions have been created and stored in the PAS 450 (or in any other accessible storage location), a student as the performer 402 may avail herself of this stored information when attempting to perform/ practice the trick or maneuver. Although various components are shown in FIG. 4 as being within the on-site device 410, the term "on-site device" as used herein is to be generally construed and should not be interpreted as a single and/or dedicated device, but rather it may be comprised of many different components, including a user device, such as a smart phone, that is used when performing the maneuver.

For real-time processing and feedback, the student 402b may need to access the PAS 450 in real time, or at least have fast access to the relevant OMP and, optionally, the associated conditions for storage on the on-site device 410. The student 402b may search for the OMP using an expected name for the maneuver and/or any related tags, e.g., "half-cab", "snowboard". The student may, e.g., be able to view a brief video of the maneuver to ensure that they have accessed the proper one. In another embodiment, however, the student may be able to simply record the raw data on the on-site device 410 coming from the sensors 415 and then perform the analysis at a later time once the OMP is available.

It is not essential that the same sensor(s) 415 is used for the student 402b as was used by the professional 402a, as long as the same high-level information serving as a basis for comparison can be derived. For example, the motion for the professional's left forearm in the OMP may have been derived from combined data from a wrist accelerometer and an elbow accelerometer, whereas the motion data for the student's forearm may be derivable from video footage. Once processing of the underlying sensor information is complete and normalized, the analysis may be performed on the derived, higher level forearm motion, despite differing origins of the data. The analytic components (hardware and/or software) may reside in the PAS 450 (e.g., using the PAS processor 452), the on-site device 410 (e.g., using its processor 412), or some combination of the two.

Differing conditions under which the professional 402a performed the maneuver and the student 402b is performing the maneuver may be taken into account by the conditions. For example, if the professional 402a recorded the maneuver on a calm day, but there is a twenty mile-per-hour headwind when the student 402b is going to perform the maneuver, it may be possible for the analysis to take this variable into account. For example, the feedback from the feedback component 440 may suggest an approach at a greater speed to the student 402b than was used by the professional 402a in order to accommodate the headwind. Thus, the feedback from the feedback component 440 may be provided to the student 402b based on a comparison performed by the compare component 430 that has access to the OMP and the relevant conditions for the OMP. This may be performed using the TMP described above. Furthermore, as described herein, certain factors may be accommodated via a condition, whereas others may be accommodated by a separate OMP. By way of example, the professional may make a first performance at temperature T1. The same or another professional may make a second performance at temperature T2. These two separate performances may be encompassed by two separate OMPs. When a student attempts to perform the maneuver, the temperature at the student's location may be measured. If the student's temperature is closer to T1, then the OMP of the first performance may serve as a base, whereas if the student's temperature is closer to T2, then the OMP of the second performance may serve as a base. A plurality of such conditions may be taken into account to assess which professional's performance is the best one to use under the conditions of the student performance. The analysis may be done using any standard technique, such as a weighted factor analysis or any other form of relevant analysis described herein.

When the analysis is performed off-line and after the student's 402b performance of the maneuver, such feedback may, in some embodiments, be done in a visual manner. For example, a side-by-side video may be shown of the OMP video time synced with a video of the student performing the maneuver. Detected variances between the two may be highlighted by, e.g., overlays applied to one of the videos. For example, if the student's leg is too far forward at a particular stage of the maneuver, the leg portion may be highlighted in red or yellow and arrows may indicate a direction that the leg should be in for a better performance of the maneuver. The analytics or analysis software may reside in an analysis component 420 of the on-site device 410, and may contain routines for performing spatial analysis, translations, definitions, and the like, similar to the analysis component 480 of the PAS 450. The analytic functions may be split across these respective analyze portions 420, 480. The off-line analysis of the compare component 430 may be based on a comparison between the OMP of the professional and the SMP of the student, along with the stored condition information associated with each.

For the real-time analysis and feedback, similar information may be shown in real time in a heads-up display (HUD) or augmented reality (AR) display of the student 402b. In other embodiments, the feedback from the feedback component 440 may be provided in a haptic manner, providing, e.g., vibrations on a part of the student's 404 body that should be adjusted. For example, if the student 402b needs to move their left leg forward, vibrators on the front part of the lower left leg may be vibrated, whereas if the student 402b needs to move their leg backward, vibrators on the rear part of the lower left leg may be vibrated. A similar mechanism may be utilized for left and right motions of various body parts. Care may be taken to ensure that the weight, location, and other factors associated with the sensors minimally interfere with the performance of the maneuver.

In some embodiments, the feedback from the feedback component 440 might also assist the student 402b with the necessary motion to correct their performance of the maneuver or to prevent injury. In these embodiments, the student may wear a device, such as an exoskeleton having enough force to suggest, assist, and/or force movement of a particular body part. In some embodiments, such body part movement may be stimulated by applying voltages to various muscle groups.

In any case, the feedback from the feedback component 440 may be determined and provided to the student 402b in any manner that is able to demonstrate a difference in any or all of the variables between the student's current performance and that of the OMP and related conditions. The feedback from the feedback component 440 need not be provided as a total difference between the performance of the student 402b and the professional 402a stored in the OMP. In some embodiments, the differences provided to the student 402b may just be enough to permit the student 402b to advance to a next stage of performing the maneuver. Thus, staged information for performing a maneuver may be stored in the OMP or related conditions, and the system may analyze the variables associated with the OMP of the professional 402a alongside the variables of the student 402b. The system may make prescriptive recommendations or provide the feedback from the feedback component 440 to the student 402b in a way that may allow the student 402b to make incremental improvements towards perfecting the maneuver.

In some embodiments, the OMPs may contain physiological or biometric data, including weight, height, body part size, etc. In addition to such generally static information about the professional 402a and student 402b, which may be entered by the professional or student and stored in a professional or student profile (in either the PAS 450, on-site device 410, or in some other location) (and associated or contained within the maneuver profile database 460), this information may contain dynamic information during the maneuver as well, such as heartrate, blood pressure (if appropriate sensors are present), and the like. Within the overall process and modeling, biometric data may be an important consideration when building a predictive model. For example, if a student 402b has a higher than normal sustained heart rate even after resting periods, this may affect the student's ability to execute at peak performance levels and even to perform the maneuver at all. In a situation where a student 402b may exceed a predefined threshold, the feedback from the feedback component 440 may include informing the student to take longer break, more breaks, or develop additional stamina (e.g., through cardiovascular exercises) before attempting the maneuver again.

The above discussion has made mention of cloud technologies and considered client-server architectures in which, for example, the system 400 of FIG. 4 permits functionality to be split across devices (e.g., the on-site device 410) and server (e.g., the PAS 450). Use of IoT technology may be applicable here in which extremely fast networks rates and response times, such as that found in 5G networks, coupled with on-site processors, may permit more complex architectures to be utilized. In addition to use of a plurality of sensors 415 that utilize IoT technologies and that may be mounted at a number of different places, a plurality of on-site devices 410, such as those described above, may be utilized in the system, with each possibly comprising their own analyze 420 components and each able to communicate with one another to share information. Such an arrangement may be useful for very complex and choreographed movements, such as a synchronized performance, or any other situation in which a plurality of performers are involved. For the above use case, the data collected for an individual and/or a group of similar snowboarders trying to perform a maneuver using IoT sensors attached to the body, equipment being used, and surrounding structures or locations, may be uploaded to the cloud and may be compared to similar maneuvers performed by experts using machine learning algorithms, such as clustering and multi-variate linear regression. In the use case, the comparison may predict the areas and precise information which are prescribed as guidance in real-time to the group of snowboarders, e.g., on their headsets, while they are practicing the tricks for better performance.

In some embodiments, the maneuver profile database 460 may comprise the historical performances SMPs of a student 402b that may be compared to one another, in conjunction with an OMP, by the analysis component 480 of the PAS 450 so that the student's 402b progress may be assessed. This may be helpful when a particular maneuver requires a staged approach. Once the PAS 450 determines that the student 402b has successfully mastered stage one of a maneuver, the student 402b may then be directed to begin practice on stage two of that maneuver.

Referring back to the half-cab maneuver, in this maneuver, the body part spatial information may include information about an ankle point, a knee point, and a lower-leg line segment having the ankle and knee as endpoints. During different stages of performing the half-cab, there may be optimum positions for the lower-leg, e.g., relative to the upper leg, the body torso, and arms. This information may be stored within the table 500 as the body part spatial information 530. Similar information may be stored for parts of the snowboard in the equipment part spatial information 540. By way of example only, the half-cab may be analyzed by focusing on five impacting variables to manage when attempting to perform such a trick. These may include: body position in the approach 532, the angle of the board in entering the maneuver 542, a speed adjustment for the maneuver 534, 544, body rotation during the maneuver 534, and the landing position post-maneuver 536, 546. Each of these variables may be choreographed perfectly or to within a fairly tight tolerance to perform the trick and perform it with style, although some variables may be more crucial than others. The analytic and feedback techniques described herein may perform a comparison between the student's spatial information for body 530 and equipment 540 and the professional's spatial information for body 530 and equipment 540 and provide feedback information to the student to allow incremental improvement. In one implementation, it may be recognized that a potential injury may result if the student continues the maneuver, and in such a situation, feedback may be provided to prevent injury.

Figure 6:
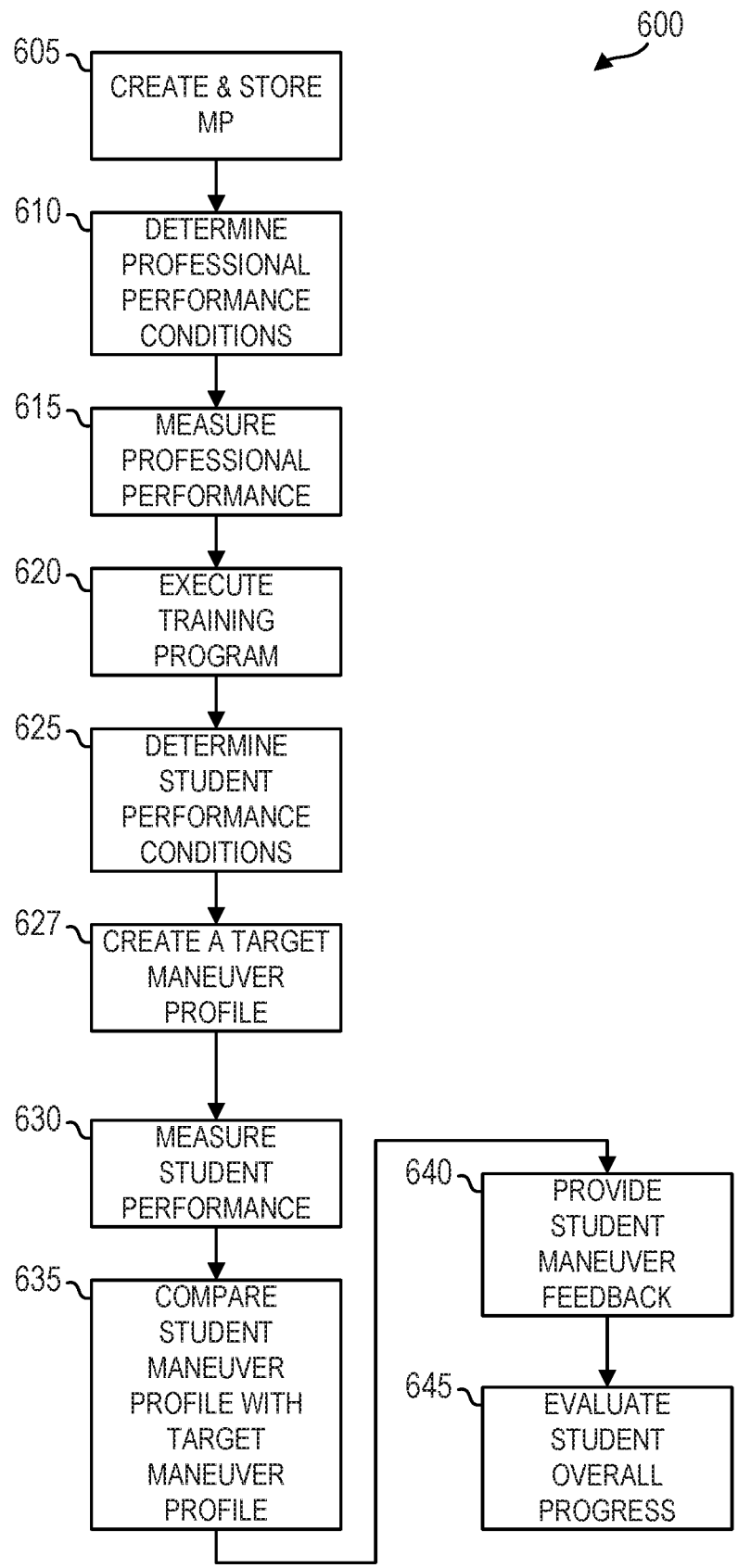
FIG. 6 is a flowchart of one or more embodiments of a process disclosed herein.

FIG. 6 is a flowchart that illustrates an example process 600 that may be utilized within the system 400. In operation 605, a maneuver profile MP for a maneuver may be created and stored within the maneuver profile database 460 along with performance invariant conditions ICOND (i.e., conditions that do not relate to a performance of the maneuver).

Variables may include those described herein. Some of the information may be obtained using outside sources, and may be gathered through, e.g., natural language processing of network accessible sources, e.g., through YouTube videos, blog posts, sports magazine articles, etc. These variables might include, e.g.:

G=Goal of the maneuver M, encompassing approach, execution, and recovery, including movement and/or spatial information F=Form/technique/body position of the performer 402

E=Equipment required 404

Th=Current thought/teachings on best practices for performing M, including partitioning M into steps or components CM, PCM to master in preparing for completing the entire M. For instance, in the use case, the snowboarder student 402b, when practicing M=half-cab, may be practice a simple turn CM before trying the complete M.

Various example functions describing the maneuver profile MP may include:

| | |
|---|---|
| f1(G) | Movement or spatial information of the equipment 404 (e.g., snowboard), movement or spatial information of the performer 402, recovery position, etc. |
| f2(F + Th) | Angle of body parts, such as joints, arms, legs, waist, etc., of the performer 402, angles of equipment 404 parts in relation to surrounding elements, optimal landing position of the performer 402, and equipment 404, etc. |
| f3(E + Th) | Equipment 404 material composition and condition, features, e.g., binding type and materials, boot type materials, specialty/custom equipment, possible substitutions for missing/inadequate equipment, etc. This may be a part of the conditions ICOND, COND described above |
| t | (component of maneuver vector) fT(G, F, E, Th) = f1(G) + f2(F + Th) + f3(E + Th) + ... fn(...) (the function representing a given component of the maneuver) |

Reiterating the above, the function that represents the maneuver M may include, among other things, the movement of the equipment 404, such as the snowboard, the movement of the performer 402, the recovery position, the optimal angles of joints, arms, legs, waist, etc. of the performer 402, angles/position of the equipment 404, such as the angles/position of the snowboard in relation to surroundings, the optimal landing position of the performer 402 and equipment, equipment material composition and condition, and other elements of the equipment such as the binding type and materials, boot type and materials, specialty/custom equipment, possible substitutions for missing/inadequate equipment, etc.

Using the data for a component of the maneuver CM, it may be possible to determine a profile for a plurality of component maneuvers (T1, T2, T3, ... Tn) forming a given maneuver M. A maneuver profile vector m may be in the same dimensions as the maneuver component CM vectors $t_1, t_2, \ldots t_n$, but is not limited to these dimensions and may include any additional dimensions significant to be considered for each maneuver component CM. Thus, $$m = fM(t_1, t_2, \ldots t_n).$$

A training program for performing the maneuver M may be created and stored here. This may be particularly desirable where the M is broken into CMs and/or PCMs (collectively referred to as CMs below). In this situation, to accomplish a given M, the student 402b may need to practice the CMs before attempting the complete M. In the use case discussed above, in order to perform a half cab, the student 402b may practice the component of the 180° switch while not moving in an x, y, z direction. This allows the student 402b to perfect their balance and form to ensure proper leg and body movements. After mastering a given CM, the student may advance to the next, more complicated CM, and after completing the necessary CMs, may eventually attempt the complete M. The CMs may be determined and performed by the professional 402a and may be delineated in the OMP. Some Ms may have CMs in common. A CM that is common to a first M and a second M need not be completed a second time for the second M if completed successfully for the first M. In this way, steady progress on a number of Ms may be tracked without requiring a great deal of replication for skills already developed.

In operation 610, some of the conditions C may be determined at a time of performing the maneuver M by the professional 402a. The performance related conditions COND may include information that uses machine learning to be modified on a real-time basis. As noted above, a required parameter associated with a maneuver M may be dependent upon certain condition variables. By way of the use case example, the required approach speed for the half-cab may be dependent on certain condition variables, such as wind direction and speed, snow conditions, humidity, etc., as well as performance independent conditions ICOND, for example, information about the setting of the maneuver M, which, in the use case, may include slope of the terrain, slope of the ramp, height of ramp, drop after ramp, etc. These condition variables might be:

W=Weather data: e.g., obtained from a weather service provider, such as The Weather Company®, Accuweather®, cell phones, local weather station, etc.

S=Setting information derived from, e.g., cell phone images, GPS data, map data service providers, other camera image data, etc.

P=Personal data reported by the performer, captured from cameras, etc.

E=Equipment 404 information reported by the performer 402, derived from financial transactions, obtained from sale/catalog websites or product databases, etc.

Various example functions may be defined as follows:

| | |
|---|---|
| f1(W + S) | A first function may include, for example, the temperature, wind speed and direction, humidity levels, barometric pressure, elevation, slope of the mountain, known patches of ice on or around the maneuver site, length and slope of ramp, height of ramp, etc. This may provide a dimension based on the weather and setting of the given maneuver. |
| f2(P + E) | A second function may include, for example, the performer's height, weight, strength, clothing information, dexterity, snowboard type and materials, condition information such as last sand/wax, age, etc. |

| | |
|---|---|
| | This may provide a dimension based on the performer and equipment in use. |
| c | A profile of conditions (C) may be built. Machine learning (ML) may constantly re-evaluate these inputs on a real-time basis.<br>The following may represent this vector:<br>c = fC(f1(W + S) + f2(P + E))<br>The variables may include, e.g., temperature, wind speed and direction, humidity levels, barometric pressure, elevation, slope of the mountain, known patches of ice on or around the maneuver site, length and slope of ramp, height of ramp, height, weight, strength, clothing information, dexterity, snowboard type and materials, condition information such as last sand/wax, age, etc.<br>c may be (but is not limited to) a vector of different dimensions than those mentioned above. This vector may further represent forces that act upon the performer and may impact performance of a given M. |

In operation 615, a given performance PR of a professional 402a performing the maneuver M may be determined. This information may be compiled from information produced by the sensors 415, such as cameras, GPS devices, wearable sensors, and other sensors discussed above. By using the same data points as defined above, it may be possible to compute a performance vector pr under the current conditions C. These inputs may provide values for all components of the maneuver CM, such as approach, execution, and recovery. The performance vector may then be represented as:

$$pr = fPR(F,E,C) = f1(F) + f2(E) + f3(c)$$

Summarizing, in the use case, the variables incorporated may include, among other things, the movement of the snowboard, movement of the performer, recovery position, optimal angle of joints, arms, legs, waist, etc., of the performer, angles of the snowboard in relation to the surroundings, an optimal landing position of performer and snowboard, the snowboard material composition and condition, binding type and materials, boot type and materials, specialty/custom equipment, possible substitutions for missing/inadequate equipment, etc.

The following is an illustrative example equation for computing a dimension of a performance pr:

$$\tan \theta = \frac{g \cos \alpha}{g \sin \alpha \cos \beta + \frac{v^2}{R_T}}$$

where:
α slope angle
β angle the snowboard makes with the line of constant altitude
v speed of the snowboard on approach
θ angle between the slope and a line passing through the approximate contact point and center of gravity
$R_T$ radius of the turn (curvature)
g gravitational force constant An example use of this equation is discussed in more detail below, with respect to FIGS. 8A and 8B. The collective information associated with the professional's performance of the maneuver M and the associated conditions may be contained in the maneuver profile database 460 in an OMP. The OMP of a given maneuver M may contain as much information as may be needed to perform the ideal M, and may be updated on a real-time basis to include new information related to new professional performances and new conditions under which those performances are done. In addition, the professional, upon completing a performance of the maneuver, may utilize editing tools to include additional information usable by a student to improve their performance of the maneuver. For example, the professional may add an annotation with respect to the approach, "when learning this maneuver, it may be helpful to lower your center of mass more than you would once you have mastered it". This additional information may contain various training tips, alternate ways of performing the maneuver, indications of potential problems, etc. The system may receive this additional information and add it to the OMP.

The training of the student 402b begins in operation 620, with the student 402b indicating an interest in performing the maneuver M via, e.g., an app on their performer device 406. In the use case, the student 402b may, e.g., select "snowboarding" from a drop-down menu indicating a general sport of interest, and then, based on a further drop-down menu, select, "half-cab" as the maneuver M of interest. Information about available sports and associated maneuvers may be provided by the PAS 450 accessing the maneuver profile database 460. The PAS 450 may then assess the student's progress by determining which CMs have been successfully completed (discussed in more detail below).

In the use case, at this point, a first CM is presented to the student 402b, as they are just beginning the training, which, for example, is a 180° switch while not moving in an x, y, z direction. Performance of this CM allows the student 402b to perfect their balance and form to ensure proper leg and body movements before advancing in their practice. Instructions for performing the CM may be presented to the user on their performer device 406, and the student 402b may then attempt to perform the CM. The sensors 415 may record relevant conditions C, as discussed above, associated with the current performance of the CM. As the student then performs (or attempts to perform) the CM, the sensors 415 record information relevant to the performance.

In operation 625, the student performance conditions may be determined in a manner similar to those described above in operation 610 for determining the professional performance conditions.

In operation 627, a target maneuver profile TMP may be created that will serve as a basis of comparing the student's performance to that of the professional, but modified by conditions in the database, which may include performance independent conditions, the conditions related to the professional's performance, and the conditions related to the student's performance. At this point, it may be desirable to provide the student with preliminary instructions for performing the maneuver based on at least one of the MP, the OMP, and the TMP (although instructions to the student may be provided at any stage described herein—however, once the student has begun performing the CM or completed the CM, these instructions are referred to herein as "feedback"). These student instructions may be in the form of at least one of, e.g., text, audio, and video.

In operation 630, the student performance may be measured in a similar manner as described above in operation 615 with respect to the professional performance.

In operation 635, an evaluation of the performance of the CM may be made for the student 402b in real-time, as the student 402b performs the CM, or after the CM is completed. The student's 402b performance for the CM (SMP) may be compared, using the analyze component 420 and/or

480, to the target maneuver profile TMP or the professional's performance for the CM (OMP) modified to take the conditions C into account.

In operation 640, the system 500 may provide the analysis, the feedback, and any control-related information to the student 402b performing the CM. As noted above, the feedback may be provided by the feedback component 440 in real-time or after the CM is performed. For after-the-fact feedback, information may be provided, for example, as text in a printout, on a display, or in a speaker to the student 402b, and may contain any of the above-described information related to the student's performance of the CM. In one implementation, feedback may be provided by presenting an animation of the student's 402b performance, possibly side-by-side, or overlapped with the professional's performance of the CM with differences highlighted.

The real-time feedback may be presented to the student 402b similar to the after-the-fact feedback, via, e.g., an augmented reality (AR) display worn by the student 402b during the performance, but may also contain anticipatory instructions for assisting the user in performing the CM. For example, the user may be wearing an AR display with speakers, and the feedback component 440 may provide the student 402b with the instruction, "You're approaching the turn, so move your left leg forward a little bit more." With critical timing requiring fast reaction/response times, the haptic feedback or the controlling functions discussed above may be utilized to help the student 402b correctly perform the CM and/or avoid injury. Both real-time feedback and after-the-fact feedback may be provided to the student 402b. For example, the student 402b may receive the real-time feedback as discussed above, but then may be able to review a video and/or text description of her performance at a later time. A video or text feedback description may be further annotated to allow the student to see specific variances of their own performance from the optimum or target maneuver profile.

Evaluation feedback (as opposed to in-the-moment performance feedback) may be provided after the performance of the CM by the student 402b is complete. In some embodiments, the SMP associated with a CM may include a success of performance (SP) variable that provides a score on the CM for the student 402b. The SP variable may be based on differences between comparing the professional (OMP) performance vector(s) pr, with the student (SMP) performance vector(s) pr, making up a CM, taking into account the conditions C. The differences in the comparison for each of the constituent variables making up the prs may be tallied using, e.g., a weighted factor analysis, where the weightings to be determined e.g., by the professional 402a. For such weighted factors, an excellent value for one factor may compensate for a poor value in another. There may also be certain variables or factors that are analyzed according to various thresholds that may be defined, such that a failure on one particular variable may mean that the student 402b has failed on the entire CM. The feedback evaluation may compare a student's 402 current SMP with past SMPs for a given CM to assess an extent of improvement in performing the CM. In this way, the student's progress in performing the CM or even the overall M may be easily tracked.

By way of example, the SP variable may be a value between 1 and 10, with 10 being an ideal performance, which may be similar to a rating system used in many sporting activities, such as gymnastics, where a score above a threshold value indicates success. A determination of success may also use a more complex formula based on any number of variables contained within the OMP and SMP.

The evaluation feedback may further comprise words of encouragement to help the student 402b feel a sense of accomplishment while at the same time providing helpful tips for the next performance. For example, the evaluation feedback may comprise information indicating, "Your current attempt is good because you've moved your rear leg forward, as you needed to, right before making the turn. However, your rear leg still needs to move forward a little bit more for the next time. Your improvement is really great for this maneuver and the crowds will be cheering for you in no time!" This evaluation may be stored, e.g., in the SMP for this particular student's performance along with feedback provided to the user.

In operation 645, the student's overall progress may be evaluated. Just because a student 402b is able to perform a CM successfully once may not automatically mean advancement on to the next CM. In some embodiments, the student may be required to successfully perform the CM a predefined number of times (successful performances for advancement (SPA)), or a predefined number of times in a row (sequential successful performances for advancement (SSPA)) in an overall completion determination, before advancing on to the next CM. Thus, the requirements for a successful performance of the CM may differ from the successful completion of the CM to advance to the next CM. This may be used to ensure a consistency of adequate performance on a CM and to rule out beginner's luck. By way of example, for a particular CM, the student 402b must achieve an SP of at least three times in a row (SSPA) before a successful completion of the CM will be indicated.

After mastering (successful completion of) a given CM, the student 402b may advance to the next CM in the training. After completing all of the necessary CMs in the training, the student 402b may attempt the complete M, and the same procedures described above with regard to the CM may be applied to the student 402b performance of the M as a whole.

Figure 7:
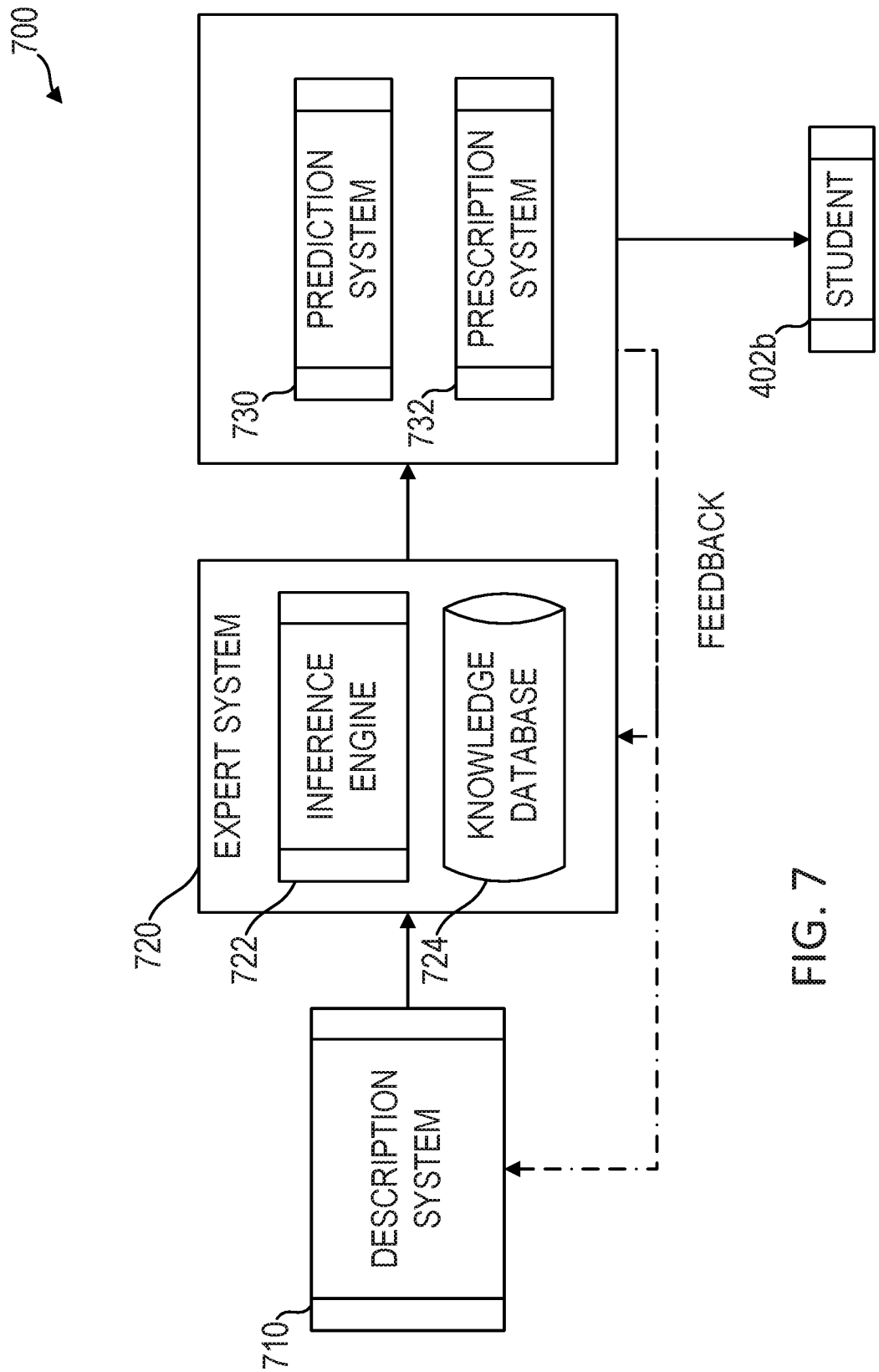
FIG. 7 is a block flow diagram of one or more embodiments of various system components disclosed herein.

FIG. 7 is a high-level flow diagram of system 700 components that may be, e.g., included in the system 400, although these components may be logical components. The descriptive system 710 is a component that contains descriptions of maneuvers and their respective breakdowns. The descriptive system may include, e.g., parts of the maneuver profile database 460 and utilize the PAS processor 452. The descriptive system 710 may be updated to reflect changes in how the maneuver should be performed, and may also include updates to the OMPs, as described herein. The descriptive system 710 may, for example, focus on capturing (and subsequently providing) what is considered to be a "best" performance for a given set of conditions, based on predefined rules or programmatic criteria.

The expert system 720 may make use of an inference engine 722 and a knowledge database 724. When the professional 402a performs the maneuver, some of the data points may be collected by the sensors 415 and stored directly, whereas other data points may be inferred by the inference engine 722 from the points collected. For example, wrist and elbow motion during a maneuver M may be measured directly, and arm motion may be inferred by using the wrist and elbow as endpoints to a line segment representing the arm.

The inference engine 722 may furthermore make use of information stored in the knowledge database 724, which may incorporate or be a part of the maneuver profile database 460, and may make inferences about situations, equipment, etc., that do not actually exist in the knowledge database 724. For example, professional 402a performance information in the OMPs may exist for performances at 0°

F. and 30° F., but not for the student's planned performance at 20° F. The inference engine 722 may make use of analytical techniques, such as interpolation, in order to determine other optimum characteristics for the student's 402b performance. Such techniques are not limited to single variables, but may incorporate a plurality of variables, such as snowboard size and shape, type of wax used, wind conditions, etc. to infer other variables.

The inference engine 722 may determine which of the OMPs (where multiples exist) is/are most appropriate to serve as the basis for comparison with the SMP, both during and after a student 402b performance. For example, it could determine that an OMP having the same equipment as used by the student 402b but at a different temperature is more appropriate than an OMP with different equipment at the same temperature.

Information from the expert system 720 may be provided to both a prediction system 730 and a prescription system 732. The prediction system 730 may be used to inform the student 402b about how the maneuver should be performed in the context of the student's performance (conditions at the location, equipment, etc.) to provide potential OMP(s) or modified temporary versions of the OMP(s) to the student 402b that best relate to the conditions under which the student 402b will be performing the maneuver. The prediction system 730 may also take into account the student's own past performances in their SMP(s). Using the prediction system 730 (in operation 610 described above, and according to various embodiments), it may be possible to use live data from the student 402b to feed the expert system 720 model based on other users (snowboarders in this use case). Such other users may be those who are similarly situated (subject to similar conditions) in order to provide real-time feedback from the crowdsourcing data provided by the other snowboarders. Such data from other users may be enhanced, as indicated below, to allow for enhanced predictive modeling provided by, e.g., the prediction system 730 based on a holistic user community being interactively tracked within a certain geolocation for a particular time interval. In other words, in the alternative to (or in addition to) a professional 402a establishing an OMP for a particular maneuver, the system may use a tracked user community that establishes a baseline (in the form, e.g., of a community-established OMP) for a predictive model 730. This may permit further data modeling which may allow for probability based models to be extrapolated based on crowd soured data pertaining to conditions that may impact the crowd.

Crowdsourcing may also be utilized as a source of additional information about a particular performance. For example, other individuals on-site may be using their own cameras to record a particular performance, either of the professional 402a or student 402b. In this scenario, the cameras from other viewers may be utilized as additional sensors that are recording information about the performance, and this additional information may be utilized in the creation of the OMP, SMP, and/or feedback to the student 402b. When such feedback is provided in real-time, the use of IoT technologies may be utilized for rapid communication of data and response time.

Predictions for temperature changes and their effects in snowboarding may be determined based on information known in the art. Predictions for wind speed changes, direction, and the effects thereof may be based on other users' completion rates that may be heavily affected by the wind speed and direction based on their abilities to overcome or utilize the wind in a positive manner. All the above items, and others, may be utilized to produce crowd sourced recommendations using the model disclosed. This may also allow for open soured data modeling based on crowdsourcing-based-data for various types of activities.

The prescription system 732 may be utilized by the PAS analyze component 480, the on-site device analyze component 420, the compare component 430, and the feedback component 440, and provide after the performance feedback to the student after comparing their performance to the OMP (or modified temporary version of it). The prescription system 732 may further be used to provide real-time feedback to the student during the performance to assist the student in achieving the ultimate goal of a successful performance.

The prescription system 732 may be further used to adjust, over time, OMPs (master template sets) that are used under different conditions according to the feedback shown in FIG. 7. By way of illustrative example, a student performing the maneuver may have a rule applied "leg angle should be 5° less that the OMP indicates under the current head wind speed of 15 miles per hour (MPH)". If the student makes this adjustment correctly, and the end result comes out as expected, then no feedback modification to the rule itself needs to be made. However, if the student makes this adjustment correctly, and the end result varies from the expectation (e.g., the end result is more extreme than what was predicted), then the feedback may modify the rule accordingly (e.g., "leg angle should be 3° less than the OMP indicates under the current head wind speed of 15 MPH"). Over time, the master template sets used (the OMPs) under particular circumstances may adjusted based on the feedback as well. This may include modifying weights of different parameters and/or adjusting rules to accommodate differences between expected outcomes and measured outcomes. Known correlation techniques utilizing various condition and performance parameters may be utilized to make the adjustments.

Figure 8A:
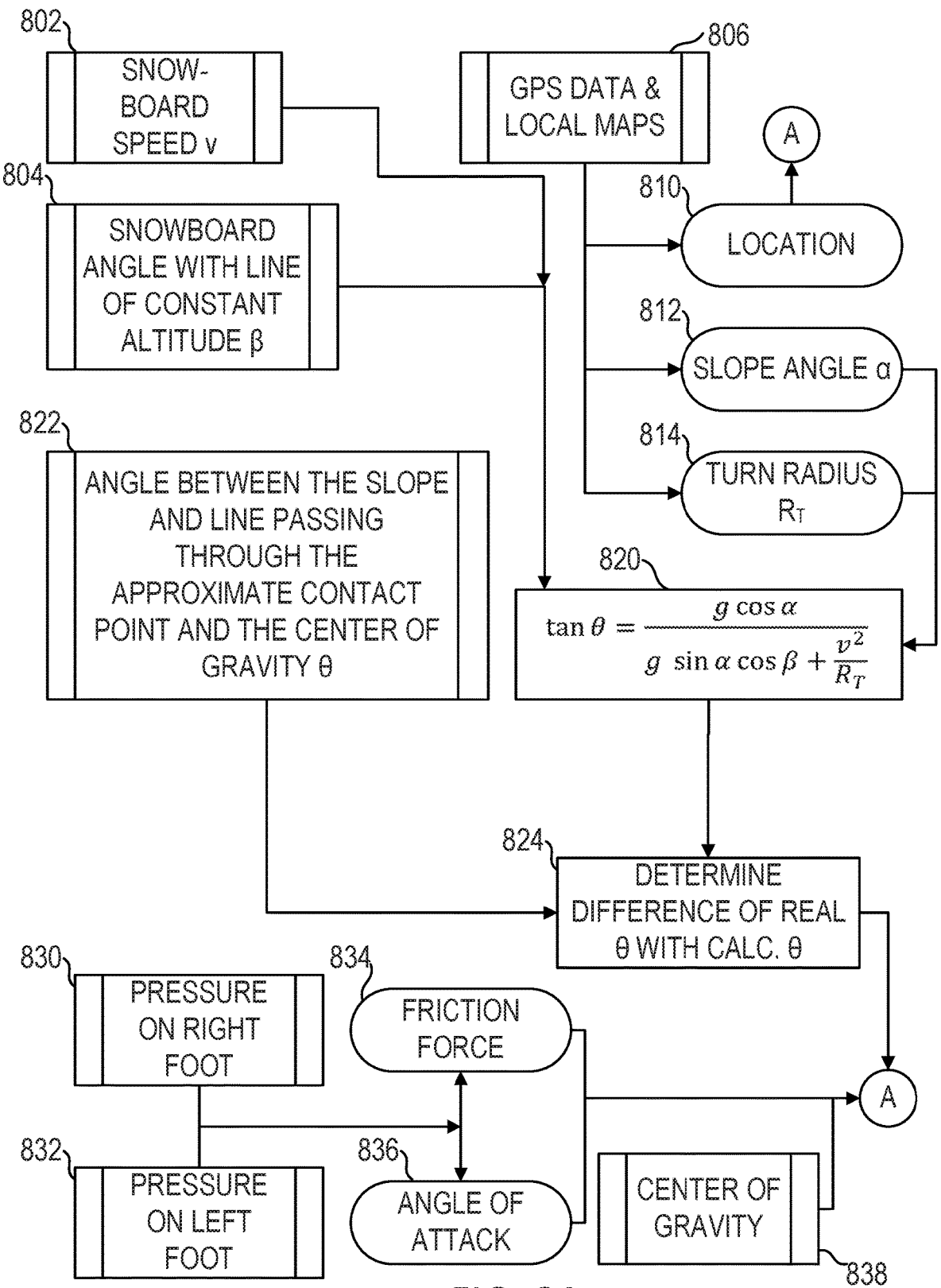
FIGS. 8A & 8B are parts of a block flow diagram illustrating an example use case with various system components disclosed herein according to one or more embodiments disclosed herein.
Figure 8B:
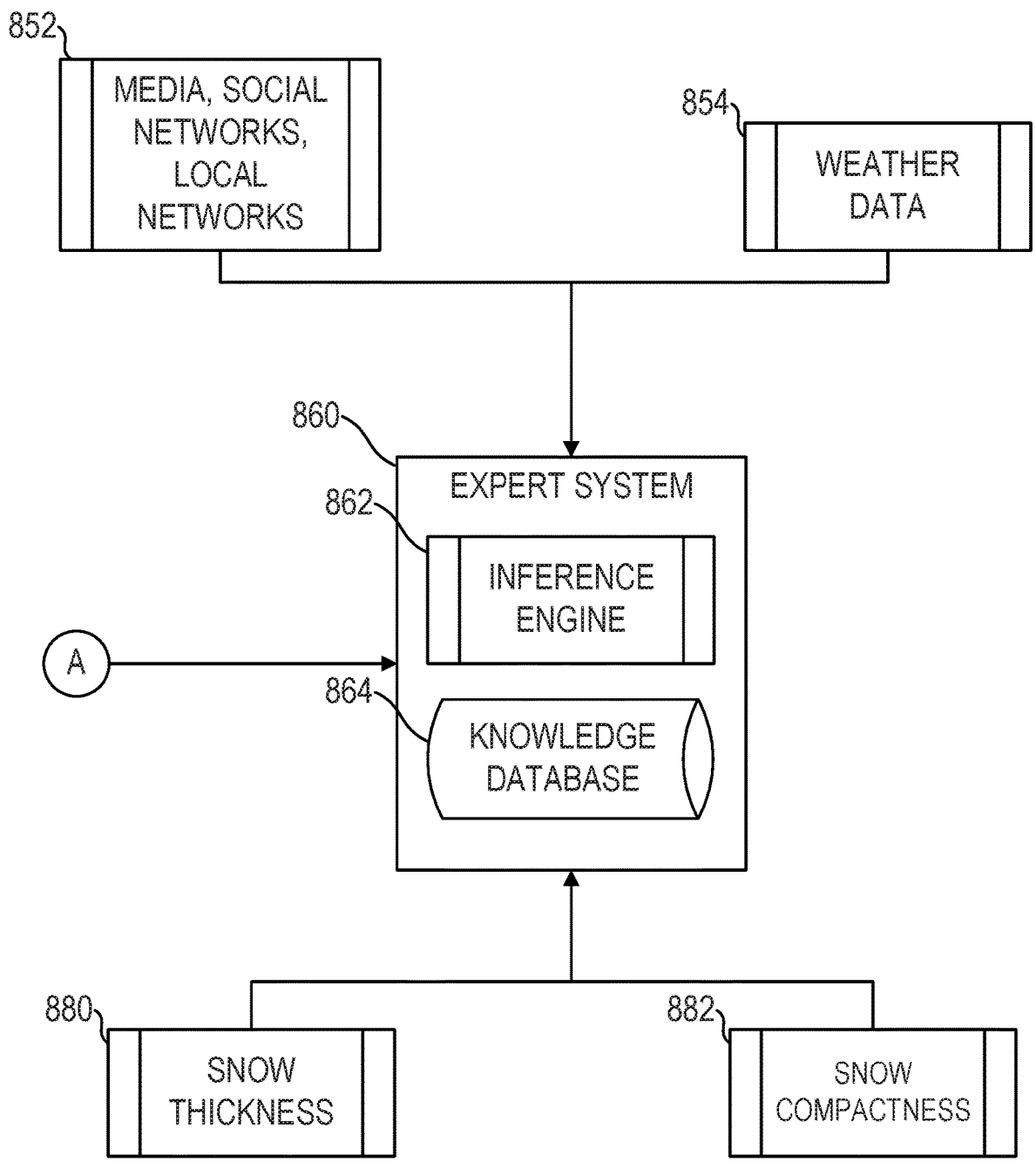

FIGS. 8A and 8B are components of a data flow block diagram illustrating a portion of the example use case discussed herein and an interaction between the description system 710 and expert system 720. The expert system 860 shown in FIG. 8B may be an example of the expert system 720 shown in FIG. 7. They illustrate how derived values that may be utilized in the snowboarding half cab use case discussed above may be obtained. FIG. 8A illustrates two variables of a performance of the half cab maneuver that may be provided to the expert system 860 and the logic that may be a part of the description system 710 in this instance. An equation illustrating input variables that may go into a determination of θ (or tangent thereof . . . θ being derivable by taking an inverse tangent of both sides of the equation), which represents an angle between the slope and a line passing through the approximate contact point and the center of gravity.

As shown in FIG. 8A, the snow board speed v 802 and the snowboard angle with a line of constant altitude β 804 are provided to the specific calculation component 820 that determines a calculated value of θ. GPS data and local maps 806 may be obtained from an external map data service provider, which may be used to obtain the location 810 of a given performance, which is subsequently provided to the expert system 860. The GPS data and local maps 806 may also provide information of the slope angle α 812 and turn radius $R_T$ 814. These values may then be provided to the specific calculation component 820 to determine a calculated value of θ:

$$\tan\theta = \frac{g\cos\alpha}{g\sin\alpha\cos\beta + \frac{v^2}{R_T}} \text{ or}$$

$$\theta = \tan^{-1}\left(\frac{g\cos\alpha}{g\sin\alpha\cos\beta + \frac{v^2}{R_T}}\right)$$

A measured value of θ during a performance 822 may be obtained, and a difference between the real/measured value of θ during a performance may be compared to the calculated value of θ at 824. If there is little to no difference, then the adjustments made to the performance were appropriate and no changes need to be made. If there is a difference, this suggests that there was a problem with adjustments made to the performance, and that future adjustments may need to be modified so that the measured performance more closely aligns with the calculated feature of the performance. This may be achieved by adjusting rules, adjusting weighting factors of parameters, and the like.

As shown in FIG. 8A, the pressure (measured and/or calculated) on the right foot 830 and on the left foot 832 may be used to determine, e.g., a friction force 834 and an angle of attack value 836 which may, along with a combined with a calculated center of gravity 838, be provided to the expert system 860. As shown in FIG. 8B, in addition to these values being provided to the expert system 860, for example, the expert system described above comprising an inference engine 862, such as inference engine 722 and knowledge database 864, such as knowledge database 724 discussed above, information from the media, social networks, and local networks 852 may be provided to the expert system 860 as well, in addition to environmental information, such as weather data 854, snow thickness 880, and snow compactness 882.

Although the use case example described in the above focuses on a snowboard application, and in particular, an example half-cab maneuver, a much broader application may be clearly extended to any maneuver involving human motion. Many sports rely on complex maneuvers in order to successfully master them, such as golf, tennis, skateboarding, lacrosse, baseball, basketball, football, swimming, gymnastics MMA fighting (jiu jitsu submission techniques, karate, etc.) etc. Furthermore, many trades require specific movements and feedback on such movements, such as operating power equipment (e.g., crane, backhoe), lifting, and the like to which various embodiments may apply. Other embodiments may apply to applications requiring precise movement of body parts, such as art techniques, operating machinery (fork lifts, rally car racing, etc.), pool, darts, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving an optimal maneuver profile (OMP) that is based on a maneuver profile (MP) comprising spatial information to perform a maneuver (M) and MP conditions associated with the MP;
determining student conditions present at a student performance location;
creating a target maneuver profile (TMP) for a student to perform that is based on the OMP that factors in professional conditions under which the OMP was created, the student conditions, and the MP conditions;
measuring a student performance of the maneuver using a sensor;
recording a student maneuver profile (SMP) that includes measured spatial information of the student performance;
comparing the SMP with the TMP to produce a comparison; and
providing automated feedback based on the comparison.

2. The method of claim 1, further comprising:
creating the MP;
storing the MP in a maneuver profile database (MPDB) stored in a memory of a proprioceptive analytics server (PAS);
storing the SMP in the MPDB; and
storing the comparison in the MPDB.

3. The method of claim 1, wherein the MP is based on:

$$T=fT(G,F,E,Th)=f1(G)+f2(F+Th)+f3(E+Th);$$

wherein:
G=at least one goal aspect selected from the group consisting of goal movement and goal spatial information;
F=Form of a performer;
E=equipment required; and
Th=text, video, and audio-based additional student instruction for performing the goal movement.

4. The method of claim 1, wherein the maneuver (M) comprises components of the maneuver (CMs) that are stored in the MPDB, and the MPDB further comprises practice components of the maneuver (PCMs) that are used to train the student but do not form a part of the maneuver.

5. The method of claim 1, wherein the feedback is real-time feedback provided via a head-mounted display wearable by the student.

6. The method of claim 1, wherein the feedback is real-time feedback provided via a device selected from the group consisting of a haptic and a controlling device wearable by the student.

7. The method of claim 1, wherein:
the spatial information is selected from the group consisting of position information, velocity information, and acceleration information; and
the position information includes spatial coordinates and angular components.

8. The method of claim 1, wherein the TMP is derived from multiple OMPs.

9. The method of claim 1, further comprising:
calculating a score based on the comparing of the SMP with the TMP to determine a successful completion of the maneuver based on a predefined threshold.

10. The method of claim 9, further comprising:
determining an overall completion success based on the successful completion of the maneuver a predefined number of times.

11. The method of claim 10, further comprising:
advancing the student to a new component of the maneuver upon determining the overall completion success.

12. The method of claim 1, wherein the feedback is provided after completion of the maneuver.

13. The method of claim 12, wherein the feedback is selected from the group consisting of text and video, and further comprises an annotation comprising one or more variances of the SMP and the TMP.

14. The method of claim 1, wherein the sensor is a plurality of sensors that comprise both on-site sensors and wearable sensors and at least one of the on-site sensors and wearable sensors are Internet-of-things (IoT) sensors.

15. The method of claim 1, further comprising deriving values that are included in the SMP from sensor data.

16. The method of claim 1, wherein the feedback is real-time haptic feedback, the method further comprising applying the haptic feedback to muscles requiring adjustment.

17. The method of claim 1, wherein conditions constituting the MP conditions, the professional conditions, and the student conditions include weather conditions, terrain information, and equipment conditions.

18. A computer-implemented method, comprising:
creating and storing, in a maneuver profile database (MPDB) stored in a memory of a proprioceptive analytics server (PAS), a maneuver profile (MP) comprising spatial information to perform a maneuver, and MP conditions associated with the MP;
determining professional conditions present at a professional performance location;
measuring a professional performance by a professional as a performer of the maneuver using a sensor and recording an optimal maneuver profile (OMP) that includes measured spatial information of the professional performance into the MPDB;
determining student conditions present at a student performance location;
creating a target maneuver profile (TMP) for a student to perform that is based on the OMP stored in the MPDB and that factors in the professional conditions under which the OMP was created, the student conditions, and the MP conditions associated with the MP;
measuring a student performance by the student as the performer of the maneuver using a sensor and recording a student maneuver profile (SMP) that includes measured spatial information of the student performance into the MPDB;
comparing the SMP with the TMP to produce a comparison and storing the comparison in the MPDB; and
providing automated feedback based on the comparing.

19. The method of claim 18, further comprising:
receiving an indication that the performer is a professional;
receiving a further indication whether to keep information from the professional performance or not;
responsive to the indication to not keep the information from the professional performance, discarding the information from the professional performance.

20. The method of claim 18, further comprising:
delineating the maneuver (M) into components of the maneuver (CMs) that are stored in the MPDB, and the MPDB further comprises practice components of the maneuver (PCMs) that are used to train the student but do not form a part of the maneuver.

21. The method of claim 18, further comprising:
receiving additional information selected from the group consisting of training tips, alternate ways of performing the maneuver, and indications of potential problems; and
adding the additional information to the OMP.

22. A proprioceptive analytic system, comprising:
a sensor that records information at a location of a performance of a maneuver (M);
a processor configured to:
receive an optimal maneuver profile (OMP) that is based on a maneuver profile (MP) comprising spatial information to perform the M and MP conditions associated with the MP;
determine student conditions present at a student performance location;
create a target maneuver profile (TMP) for a student to perform that is based on the OMP that factors in professional conditions under which the OMP was created, the student conditions, and the MP conditions;
measure a student performance of the maneuver obtained from the sensor;
record a student maneuver profile (SMP) that includes measured spatial information of the student performance;
compare the SMP with the TMP to produce a comparison, and; and
provide automated feedback based on the comparison.

23. The system of claim 22, further comprising:
a proprioceptive analytics server (PAS); and
a memory in the PAS comprising a maneuver profile databased (MPDB);
wherein the processor is further configured to:
create the MP; and
store the MP in a maneuver profile database (MPDB) stored in a memory of a proprioceptive analytics server (PAS);
store the SMP in the MPDB; and
store the comparison in the MPDB.

24. A proprioceptive analytic system, comprising:
a proprioceptive analytics server (PAS), comprising:
a memory comprising a maneuver profile database (MPDB);
a PAS processor configured to:
create and store, in the MPDB, a maneuver profile (MP) comprise spatial information to perform a maneuver, and MP conditions associated with the MP;
an on-site device comprising:
a sensor that records information at a location of a performance of a maneuver (M) by a professional as a performer; and
an on-site device processor configured to:
determine professional conditions present at a professional performance location;
measure a professional performance of the maneuver use a sensor and record an optimal maneuver profile (OMP) that includes measured spatial information of the professional performance into the MPDB;
determine student conditions present at a student performance location;
wherein at least one of the PAS processor and the on-site device processor is configured to:
create a target maneuver profile (TMP) for a student to perform that is based on the OMP stored in the MPDB and that factors in the professional conditions under which the OMP was created, and the student conditions, and the MP conditions;
measure a student performance by the student as the performer of the maneuver by use of an Internet-of-Things (IoT) sensor and record a student maneuver profile (SMP) that includes measured spatial information of the student performance into the MPDB;
compare the SMP with the TMP to produce a comparison and store the comparison in the MPDB; and
provide automated feedback based on the compare.

25. A computer program product for a proprioceptive analytic system, the computer program product comprising a computer readable storage medium having computer-readable program code embodied therewith to, when executed on a processor:
receive an optimal maneuver profile (OMP) that is based on a maneuver profile (MP) comprising spatial information to perform a maneuver (M) and MP conditions associated with the MP;
determine student conditions present at a student performance location;

create a target maneuver profile (TMP) for a student to perform that is based on the OMP that factors in professional conditions under which the OMP was created, the student conditions, and the MP conditions;

measure a student performance of the maneuver obtained from the sensor;

record a student maneuver profile (SMP) that includes measured spatial information of the student performance;

compare the SMP with the TMP to produce a comparison, and; and provide automated feedback based on the comparison.

* * * * *